(12) United States Patent
Van Os et al.

(10) Patent No.: US 9,339,141 B2
(45) Date of Patent: May 17, 2016

(54) COFFEE BEVERAGE SYSTEM, COFFEE BREWING APPARATUS, COFFEE BEAN PACKAGING CARTRIDGE AND METHOD FOR PREPARING A COFFEE BEVERAGE

(75) Inventors: Ivo Van Os, Utrecht (NL); Job Leonardus Kneppers, Den Hoorn (NL); Richard Patrick Versluijs, Delfgauw (NL); Christiaan Johannes Maria Moorman, Moergestel (NL); Gerbrand Kristiaan de Graaff, Hillegom (NL)

(73) Assignees: Koninklijke Douwe Egberts B.V., Utrecht (NL); Koninklijke Philips Electronics N.V., Eindhoven (NL)

( * ) Notice: Subject to any disclaimer, the term of this patent is extended or adjusted under 35 U.S.C. 154(b) by 40 days.

(21) Appl. No.: 13/587,603

(22) Filed: Aug. 16, 2012

(65) Prior Publication Data

US 2013/0115351 A1  May 9, 2013

Related U.S. Application Data

(63) Continuation of application No. PCT/NL2011/050109, filed on Feb. 17, 2011.

(30) Foreign Application Priority Data

Feb. 17, 2010 (NL) .................. PCT/NL2010/050077
Feb. 22, 2010 (NL) ..................................... 2004274
Aug. 17, 2010 (NL) ..................................... 2005238
Aug. 26, 2010 (NL) ..................................... 2005278
Aug. 26, 2010 (NL) ..................................... 2005280

(51) Int. Cl.
*A47J 31/42* (2006.01)
*A47J 31/00* (2006.01)
(Continued)

(52) U.S. Cl.
CPC . *A47J 31/42* (2013.01); *A23F 5/26* (2013.01); *A47J 42/50* (2013.01); *B65B 1/12* (2013.01); *A47J 31/3614* (2013.01); *A47J 31/52* (2013.01); *B65D 85/8043* (2013.01)

(58) Field of Classification Search
CPC ......... A47J 31/42; A47J 31/52; A47J 31/005; A47J 31/02; A47J 31/401; A47J 31/3614; A47J 31/047; A47J 31/56; A47J 31/4403; A47J 31/007; A47J 31/057; A47J 31/46; A47J 31/0573; B65D 85/8043; B02C 18/0007; B02C 4/42; A01F 29/005; E03C 1/2665; A23N 1/00; B02B 3/04
USPC ............ 99/286, 280, 279, 285, 323.3, 289 R, 99/281, 282, 283, 284, 291, 300, 306, 290, 99/295, 304, 307; 241/100, 277, 101.2, 241/257.1, 258, 6
See application file for complete search history.

(56) References Cited

U.S. PATENT DOCUMENTS 1,604,058 A   10/1926  Mager
3,981,234 A *  9/1976  Nelson et al. ................... 99/483
(Continued)

FOREIGN PATENT DOCUMENTS

CN     1413340     4/2003
CN     2684712     3/2005
(Continued)

OTHER PUBLICATIONS

European Search Report for European Application No. 11154806.1, dated Jan. 2, 2012, 14 pages.
(Continued)

*Primary Examiner* — Dana Ross
*Assistant Examiner* — Hemant Mathew
(74) *Attorney, Agent, or Firm* — Foley & Lardner LLP

(57) ABSTRACT

A coffee beverage system is described including a coffee bean packaging cartridge and a coffee brewing apparatus. The packaging cartridge includes a container holding coffee beans and transportation component for transporting the coffee beans towards an exit opening of the cartridge. The coffee apparatus comprises a grinder for grinding the coffee beans from the cartridge and a brewing device for brewing coffee on the basis of ground coffee obtained by means of the grinder. The system is further provided with a metering chamber for receiving coffee beans which are transported with the aid of the transportation component into the metering chamber. In use, the metering chamber will hold a predetermined amount of coffee beans. The metering chamber comprises a bottom portion which forms a part of the grinder, said bottom portion being arranged in the coffee apparatus for rotating around an axis extending in a vertical direction.

123 Claims, 21 Drawing Sheets

(51) Int. Cl.
*A47J 31/40* (2006.01)
*A47J 31/06* (2006.01)
*A23F 5/26* (2006.01)
*B65B 1/12* (2006.01)
*A47J 42/50* (2006.01)
*A47J 31/36* (2006.01)
*B65D 85/804* (2006.01)
*A47J 31/52* (2006.01)

(56) References Cited

U.S. PATENT DOCUMENTS

| | | | | |
|---|---|---|---|---|
| 4,326,114 A | * | 4/1982 | Gerling et al. | 219/701 |
| 4,555,984 A | * | 12/1985 | Yamashita | 99/286 |
| 4,644,856 A | * | 2/1987 | Borgmann | 99/295 |
| 4,843,956 A | | 7/1989 | Lashlee | |
| 4,876,953 A | | 10/1989 | Imamura et al. | |
| 4,936,515 A | | 6/1990 | Poag | |
| 5,094,153 A | | 3/1992 | Helbling | |
| 5,193,438 A | * | 3/1993 | Courtois | A47J 42/18 241/259.1 |
| 5,217,108 A | * | 6/1993 | Newnan | 198/670 |
| 5,241,898 A | * | 9/1993 | Newnan | 99/280 |
| 5,267,507 A | * | 12/1993 | Enomoto | 99/286 |
| 5,338,409 A | | 8/1994 | Heierli | |
| 5,386,944 A | | 2/1995 | Knepler | |
| 5,463,934 A | | 11/1995 | Locati | |
| 5,632,449 A | | 5/1997 | Sandolo | |
| 5,632,499 A | | 5/1997 | Hutcherson et al. | |
| 6,067,894 A | | 5/2000 | Eugster | |
| 6,339,985 B1 | * | 1/2002 | Whitney | 99/286 |
| 7,013,796 B2 | | 3/2006 | Smit | |
| 7,051,646 B2 | | 5/2006 | Della Pietra et al. | |
| 8,047,124 B2 | | 11/2011 | Lin | |
| 8,382,017 B2 | | 2/2013 | Bich | |
| 8,383,180 B2 | | 2/2013 | Vastardis | |
| 8,439,235 B2 | | 5/2013 | Mih et al. | |
| 8,776,671 B2 | | 7/2014 | Van Os et al. | |
| 2002/0092941 A1 | | 7/2002 | Henderson et al. | |
| 2002/0129712 A1 | | 9/2002 | Westbrook et al. | |
| 2002/0153438 A1 | | 10/2002 | Glucksman et al. | |
| 2003/0025012 A1 | | 2/2003 | Lassota | |
| 2004/0025703 A1 | | 2/2004 | Ming | |
| 2004/0173101 A1 | | 9/2004 | Steckhan | |
| 2005/0258287 A1 | | 11/2005 | Rohde | |
| 2007/0062378 A1 | * | 3/2007 | Glucksman et al. | 99/279 |
| 2007/0137495 A1 | | 6/2007 | Talbert | |
| 2007/0295752 A1 | * | 12/2007 | Morin et al. | 222/153.14 |
| 2008/0098901 A1 | * | 5/2008 | Lee | 99/286 |
| 2009/0127363 A1 | | 5/2009 | Malykke | |
| 2009/0145302 A1 | * | 6/2009 | Dutertre et al. | 99/289 R |
| 2009/0165655 A1 | | 7/2009 | Aonuma | |
| 2010/0080886 A1 | | 4/2010 | Hourizadeh | |
| 2010/0308141 A1 | | 12/2010 | Bich | |
| 2013/0095218 A1 | | 4/2013 | De Graaff et al. | |
| 2013/0095219 A1 | | 4/2013 | De Graaff et al. | |
| 2013/0101717 A1 | | 4/2013 | De Graaff et al. | |
| 2013/0115351 A1 | | 5/2013 | Van Os et al. | |

FOREIGN PATENT DOCUMENTS

| | | |
|---|---|---|
| CN | 2684713 | 3/2005 |
| CN | 1830369 | 9/2006 |
| CN | 201005518 | 1/2008 |
| DE | 29 26 389 | 1/1981 |
| DE | 203 00 928 | 5/2004 |
| DE | 203 00 933 | 5/2004 |
| DE | 10 2007 008 898 | 8/2008 |
| DE | 102007008 90 0 | 8/2008 |
| EP | 0 182 137 | 5/1986 |
| EP | 0 452 214 | 10/1991 |
| EP | 0 543 591 | 5/1993 |
| EP | 6 057 50 | 7/1994 |
| EP | 0 766 943 A1 | 4/1997 |
| EP | 0 804 894 | 11/1997 |
| EP | 1 700 549 | 9/2006 |
| EP | 2 067 421 | 6/2009 |
| EP | 2 403 386 | 1/2012 |
| FR | 2565088 | 12/1985 |
| GB | 2 447 678 | 9/2008 |
| JP | 57-194178 | 11/1982 |
| JP | 07-505328 | 6/1995 |
| JP | H07-505323 | 6/1995 |
| JP | 2003-518676 | 6/2003 |
| WO | WO-94/07401 | 4/1994 |
| WO | WO-00/27262 | 5/2000 |
| WO | WO-01/48711 | 7/2001 |
| WO | WO-2004/023956 | 3/2004 |
| WO | WO-2009/046771 | 4/2009 |

OTHER PUBLICATIONS

Amended European Application No. 11154806, printed Jan. 10, 2013, 68 pages.
Bibliographical Data for European Application No. 11154806.1, no date, 2 pages.
Communication for European Application No. 11154806.1, mail date Dec. 10, 2013, 5 pages.
First Examination Report for New Zealand IP No. 601806, mail date Apr. 26, 2013, 2 pages.
International Search Report for PCT/NL2011/050109, mailing date Dec. 27, 2011, 6 pages.
International Search Report for PCT/NL2010/050077, mailing date Aug. 5, 2010, 6 pages.
English-language machine translation of JP 06046437Y2, Osaki Electric Co. Ltd., 5 pages (Nov. 30, 1994).
English Translation of First Office Action received in Chinese Patent Application No. 201180019436, issued Aug. 12, 2014, 11 pages.

* cited by examiner

COFFEE BEVERAGE SYSTEM, COFFEE BREWING APPARATUS, COFFEE BEAN PACKAGING CARTRIDGE AND METHOD FOR PREPARING A COFFEE BEVERAGE

CROSS-REFERENCE TO RELATED APPLICATIONS

The present application is a continuation of International Patent Application Serial No. PCT/NL2011/050109 filed on Feb. 17, 2011 which claims priority to International Patent Application Serial No. PCT/NL2010/050077 filed on Feb. 17, 2010 and Netherlands Application Nos. NL2004274 filed on Feb. 22, 2010, NL2005238 filed on Aug. 17, 2010, NL2005278 filed on Aug. 26, 2010, and NL2005280 filed on Aug. 26, 2010—the full disclosures of all applications listed above are hereby incorporated herein by reference in their entireties.

BACKGROUND

The invention relates to a coffee beverage system including a coffee bean packaging cartridge. In particular the invention relates to a system for preparing coffee wherein the coffee bean packaging cartridge is arranged for holding and supplying multiple servings of coffee beans and wherein the system comprises a grinder for grinding the beans and a brewing device for brewing coffee on the basis of ground coffee obtained by means of the grinder.

It is known to pack roasted coffee beans in containers that can be connected to coffee brewing apparatus that include a grinding mechanism. For such systems to be efficient the containers have often been designed to hold between 1 kg and 3 kg of coffee beans.

The patent application EP 0 804 894 A2 discloses such a coffee dispensing and brewing apparatus that comprises components for dispensing a predetermined amount of coffee to a brew basket, the components including a hopper (container) for holding a supply of coffee beans and an auger device communicating with the hopper for portioning coffee beans in a predetermined amount to a coffee grinder. The apparatus further includes a brew basket holding assembly for releasably holding the brew basket in a region adjacent a passageway to the grinder and a hot water making and delivery system for distributing a predetermined volume of hot water from a hot water holding tank to the region during a brewing cycle. The grinder motor has a right angle power transmission that couples the motor to the grinder with the motor being located below the grinder and adjacent a vertical side of the holding tank. As is clearly shown in the figures of this patent application, the coffee and brewing apparatus is a rather large machine.

Accordingly it is an object of the present invention to propose a system for preparing coffee beverages of the above referred to kind, which may be more compact. In a more general sense it is thereby an object of the invention to overcome or ameliorate at least one of the disadvantages of the prior art. It is also an object of the present invention to provide alternative structures which may be less cumbersome in assembly and operation and which moreover can be made relatively inexpensively.

Unless stated otherwise, in the description and claims coffee beans are understood to be burnt/roasted coffee beans. Coffee beans in the description and claims may be understood to cover also fragmented coffee beans, that is, coffee bean fragments, which coffee bean fragments are still to be ground for extracting desired coffee beverage. The coffee beans are for instance broken, before they are packaged. In an embodiment, at least a part of the coffee beans in the coffee bean package is divided into about thirty or less, in particular about fifteen or less, more particularly about ten fragments or less. One coffee bean fragment then comprises for instance one-thirtieth part, in particular one-fifteenth part, more particularly one-tenth part or more of a coffee bean. For instance, the coffee bean fragments comprise a half or a quarter of a coffee bean. An advantage of the use of coffee bean fragments compared with whole coffee beans can be that coffee bean fragments can be supplied to the grinder relatively simply and/or that the package can be closed off relatively simply. This is because the coffee bean fragments are relatively small and hence can slide relatively easily through openings in the package and the apparatus and/or will block the coffee bean outlet and/or closing means less easily. As the coffee beans may beforehand have been divided into fragments, though not ground, in the meantime comparatively more bean surface can come into contact with any ambient air than would be case with whole coffee beans. On the other hand, less bean surface will come into contact with air than would be the case with ground coffee, so that coffee bean fragments can be preserved better than ground coffee beans. Only just before preparation of the coffee beverage are the coffee bean fragments ground for obtaining coffee beverage. In this description, therefore, coffee bean may also be understood to include a fragmented coffee bean, that is, which is still to be ground for preparing the desired coffee beverage.

To this end according to one preferred aspect of the invention there is provided a coffee beverage system, including a coffee bean packaging cartridge and a coffee brewing apparatus. The coffee been packaging cartridge is removable connected to the coffee brewing apparatus and it is arranged for holding and supplying multiple servings of coffee beans. It includes a container comprising an interior volume and at least one exit opening defining a coffee bean outlet, the interior volume holding coffee beans and transportation means adapted for enabling transportation of the coffee beans from the interior volume towards the exit opening of the cartridge. The coffee apparatus comprises an entrance opening for receiving coffee beans which are transported with the aid of the transportation means towards the exit opening, a grinder for grinding coffee beans which have entered the coffee apparatus via the entrance opening and a brewing device for brewing coffee on the basis of ground coffee obtained by means of the grinder. The system is further provided with a metering chamber for receiving coffee beans which are transported with the aid of the transportation means into the metering chamber. Preferably after being filled the metering chamber will hold a dosed amount of coffee beans. The metering chamber comprises a bottom portion which forms a part of the grinder. The bottom portion is arranged in the coffee apparatus for rotating around an axis extending in a vertical direction. The system is arranged such that upon activation of the grinder the bottom portion is rotating around the vertical axis for transporting the coffee beans from the metering chamber into the grinder and for grinding the coffee beans. The use of a bottom portion of the metering chamber, which is part of the grinder and which rotates for emptying the metering chamber also results in a decreased height of the system compared to the alternative option of providing a separate bottom plate of the metering chamber and a separate grinder.

The metering chamber may be divided in a first chamber portion which is part of the cartridge and a second chamber portion which is part of the coffee brewing apparatus. The division of the metering chamber over the cartridge and the brewing apparatus enables to provide an even more compact coffee beverage system.

In this regard it can be advantageous for emptying the metering chamber that the bottom portion has a conical shape such that the bottom portion extends downwardly in a direction extending perpendicular to and away from the vertical axis.

It is further advantageous for the coffee beverage system according to the invention that the first chamber portion comprises the exit opening and the second chamber portion comprises the entrance opening and that the exit opening extends above the entrance opening. This provides a metering chamber which can be made relatively inexpensive.

The metering chamber may be arranged for receiving a portion of coffee beans corresponding to a dosed amount of coffee beans which is preferably necessary for preparing a single serving of coffee beverage. The transportation means may comprise a part which is movable relative to the metering chamber for effectively transporting the coffee beans towards the metering chamber upon driving of said transportation means. The coffee brewing apparatus may be provided with a motor and a vertically extending drive shaft wherein said drive shaft may be releasable connected with the transportation means of the cartridge for driving and thereby moving the transportation means upon rotation of the drive shaft by means of the motor means. The movable part may comprise a bottom and/or a plurality of vanes, which rotates around a further vertical axis upon driving the transportation means.

Furthermore, the transportation means may comprise a downwardly extending bottom wall for transporting the coffee beans towards the metering chamber under the influence of gravity. Alternatively, the transportation means may comprise a downwardly extending bottom wall for transporting the coffee beans towards the metering chamber under the influence of gravity only.

The first chamber portion may be provided with a top wall which limits the volume of the metering chamber in an upwardly vertical direction wherein the bottom portion of the second chamber portion limits the volume of the metering chamber in a downwardly vertical direction.

Alternatively or additionally, the first chamber portion may be provided with an upstanding side wall comprising an inlet opening for entering the coffee beans by means of the transportation means into the metering chamber.

It is further advantageous for the coffee beverage system according to the invention, when the transportation means are arranged for transporting the coffee beans at least in a horizontal direction for transporting the coffee beans into the metering chamber and/or towards the inlet opening of the metering chamber.

The grinder may be positioned centrically with respect to the second chamber portion. It may comprise a conical part lying in the direction of the vertical axis, wherein the conical part rotates around the vertical axis upon driving the grinder. The grinder may be driven by a motor. The drive shaft and the grinder may be driven by different motors.

The coffee brewing apparatus may comprise connection means for the removable connection to the coffee bean packaging cartridge. The connection means may comprise a recess at an upper side of the coffee brewing apparatus, the recess being surrounded by a side wall and being configured for receiving a corresponding part protruding from a lower side of the coffee bean packaging cartridge. The side wall may protrude from the upper side of the coffee brewing apparatus and be covered by a housing.

According to an embodiment of the present invention, the side wall comprises openings for receiving bayonet elements of the coffee bean packaging cartridge. The coffee bean packaging cartridge should be inserted into the recess such that the bayonet elements are inserted in the openings and then rotated in order to be connected to the coffee brewing apparatus. The side wall may comprise blocking elements for impeding a further rotation of the coffee bean packaging cartridge, when it has reached its final position. In this way, the user can easily and reliably mount the cartridge on the coffee brewing apparatus. Preferably, the coffee bean packaging cartridge should be rotated approximately 50 degrees in order to reach its final position. The connection between the cartridge and the coffee brewing apparatus may be a snap connection.

Furthermore, the recess may comprise rotatable protruding edges at its center, which are fixed at the end of the driving shaft.

The vertical axis around which the bottom portion of the second chamber portion is rotatable may run centrally through the bottom portion of the second chamber portion. The bottom portion may extend downwardly in a direction extending perpendicular to and away from the vertical axis all around the vertical axis.

The coffee bean packaging cartridge may comprise closing means for closing the coffee bean outlet when the coffee bean packaging cartridge is not connected to the coffee brewing apparatus. In this way it is avoided that coffee beans fall out of the coffee bean packaging cartridge when it is not connected to the coffee brewing apparatus.

The closing means may be configured for opening the coffee bean outlet when the coffee bean packaging cartridge is connected to the coffee brewing apparatus.

The closing means comprises a closure member at the bottom side of the container comprising the coffee bean outlet and a rotatable closing disk having an opening. In order to connect the coffee bean packaging cartridge to the coffee brewing apparatus the opening of the rotatable closing disk may be brought in a position aligned with the coffee bean outlet.

The closure member may comprise a pair of flexible latching arms and the closure disk comprises a detent, which in the closed position is caught behind the flexible latching arms The exit opening may be associated with a removable sealing element sealing the interior volume prior to activation of the cartridge wherein preferably said sealing element prevents gasses to escape from the cartridge. The beverage system may comprise means for disrupting and displacing the sealing element, preferably when the cartridge is connected to the brewing apparatus for the first time. The sealing element may be a sealing membrane.

The system may be arranged such that, in use, the grinding device is activated for emptying the metering chamber and for grinding the coffee beans collected and/or held in the metering chamber. The grinding device may be activated longer than is required for emptying or at least substantially completely emptying the metering chamber and for grinding all the coffee beans collected in the metering chamber. In this way, the emptying of the metering chamber is reliably performed. Previous to the emptying of the metering chamber and the grinding of the coffee beans, in a first step the transportation means may be driven for filling the metering chamber with coffee beans. The transportation means may be driven longer than is required for completely filling or at least substantially completely filling the metering chamber with coffee beans. In this way, the dosing of the metering chamber with coffee beans is reliably performed.

The coffee brewing apparatus may be provided with a control device for controlling the first motor and/or the grinder for performing these steps. The control device may control the brewing device wherein the control device may be arranged such that, in use, in a step which follows after that the emptying and grinding step is completed the brewing device is brewing coffee based on the ground coffee and heated water heated by a heating device of the coffee brewing apparatus. The volume of the metering chamber may be such that if it is completely filled with coffee beans the amount of beans corresponds with one dose of coffee beans for preparing a cup of coffee. The one dose of coffee beans may comprise 5-11, preferably 6-8 grams of coffee beans.

According to the invention the coffee bean packaging cartridge can also be designed to be (re)fillable with coffee beans by the consumer. Preferably the coffee bean packaging cartridge is filled with coffee beans and is not designed to be refillable with coffee beans. In that case the cartridge is a packaging for the coffee beans to be sold in a shop.

According to a further embodiment, the system further comprises a sensor arranged for detecting if the coffee bean packaging cartridge is connected to the coffee brewing apparatus. The sensor is configured to signal a result of the detection to the controller. The sensor may be a switch, for example a micro switch. The coffee bean packaging cartridge comprises a protruding part for activating the switch when it is connected to the coffee brewing apparatus. The protruding part may be located below or above one of the bayonet elements and may activate the switch when the coffee bean packaging cartridge reaches its final position. The switch may be located in an opening in the sidewall surrounding the recess at the upper side of the coffee brewing apparatus, the protruding part activating the switch through the opening. The switch may be hidden behind horizontal wall segments in the side wall and the opening may be a slit between the horizontal wall segments, the protruding part fitting in the slit. The controller may be arranged for controlling the first motor and the grinder so that they can be activated only if it has been detected that the coffee bean packaging cartridge is present. In this way, it is ensured that the system works with coffee bean packaging cartridges especially designed thereto. These cartridges may be sold by the manufacturer of the system filled with coffee beans of an elevated quality, thereby guaranteeing the end consumer a good flavor coffee beverage.

The system may further comprise an insert piece that is removable connectable to the coffee brewing apparatus in lieu of the coffee bean packaging cartridge, preferably in a same or similar way as the coffee bean packaging cartridge by using means for connecting the insert piece to the coffee brewing apparatus, which are the same or similar as the means used for connecting the coffee bean packaging cartridge to the coffee brewing apparatus. In this case, the insert piece comprises bayonet elements and a protruding part, preferably located below or above one of the bayonet elements, for activating the switch when the insert piece is connected to the coffee brewing apparatus. Since the detection of the connected coffee bean packaging cartridge and the insert piece is executed in the same way, the controller of the coffee brewing apparatus does not see any difference between these two situations. This means that the functionality of the coffee brewing apparatus is also the same.

The purpose of connecting an insert piece to the coffee brewing apparatus may be twofold. It is usable for unlocking the coffee brewing apparatus, so that the motor and the grinder(s) may be activated, also if no coffee bean packaging cartridge is connected thereto. This is useful for service and maintenance.

Alternatively, the insert piece may be used for supplying the coffee brewing apparatus with coffee beans, because the coffee bean packaging cartridges are designed not to be refillable. A favorable embodiment of an insert device for this purpose comprises a cavity having an interior volume and at least one exit opening defining a coffee bean outlet, the interior volume being arranged for receiving coffee beans. The insert piece further comprises closing means for closing the coffee bean outlet when the insert piece is not connected to the coffee brewing apparatus or not connected to the coffee brewing apparatus in its final position. The closing means are configured for opening the coffee bean outlet when the insert piece is connected to the coffee brewing apparatus in its final position. A user fills the cavity with coffee beans when the insert piece is connected to the coffee brewing apparatus in an entry position and then rotates the insert piece to its final position, resulting in the coffee beans to enter the coffee brewing apparatus to be ground.

Advantageously, the system may be arranged such that upon activation of the grinder the bottom portion is rotating around the vertical axis for transporting the dose of coffee beans from the metering chamber into the grinder and for grinding the coffee beans. The bottom part with the conical shape may lie in the direction of the first vertical axis, wherein the conical part rotates around the first vertical axis upon driving the grinder. The grinder may comprise a lower grinding disk extending around the bottom portion and an upper grinding disk extending above the lower grinding disk. The grinder may be rotationally driven by a second motor, resulting in the rotation of the bottom part with the conical shape and the lower grinding disk. Upon driving the bottom portion and lower grinding disk coffee beans are moved in an outwardly extending radial direction between the lower grinding disk and the upper grinding disk and in that the coffee beans are crunched and cut into ground coffee, because a vertical distance between the lower grinding disk and the upper grinding disk decreases in the outwardly extending radial direction.

The grinder may be a no contamination grinder, wherein after grinding the coffee beans and supplying the ground coffee to the coffee brewing device, substantially no ground coffee remains. As a result, when the cartridge is replaced by one with a different blend, the coffee of the new blend is not contaminated by the previously used blend.

The second chamber portion may comprise about 100-X % of the volume of the metering chamber and the first chamber portion may comprise about X % of the volume of the metering chamber wherein X is in the range of 2-50, preferably in the range of 5-40, more preferably in the range of 15-30. By placing a larger part of the metering chamber in the brewing apparatus a further decrease in the height of the beverage system may be obtained. This may be an issue, for example in case that the beverage system is to be placed on a kitchen sink under a cupboard.

According to a further aspect of the invention a method is provided for preparing a beverage by means of a coffee brewing apparatus as described herein above. The method comprises the following steps: In a filling step the metering chamber may be filled with coffee beans for collecting coffee beans in the metering chamber. The metering chamber may be completely filled with coffee beans or at least substantially completely filled with coffee beans. In an emptying and grinding step the grinding device is activated for emptying the metering chamber and for grinding coffee beans collected in the metering chamber. The grinding device may be activated longer than is required for emptying or at least substantially completely emptying the metering chamber and for grinding all the coffee beans collected in the metering chamber.

The invention also relates to a coffee brewing apparatus, preferably for use in a coffee beverage system according to the invention, comprising an entrance opening for receiving coffee beans, a grinder for grinding coffee beans which have entered the coffee apparatus via the entrance opening and a brewing device for brewing coffee on the basis of ground coffee obtained by means of the grinder, wherein the coffee brewing apparatus is further provided with a metering chamber for receiving coffee beans via the entrance opening, wherein the metering chamber comprises a bottom portion which forms a part of the grinder, said bottom portion being arranged in the coffee brewing apparatus for rotating around a first axis extending in a vertical direction wherein the coffee brewing apparatus is arranged such that upon activation of the grinder the bottom portion is rotating around the vertical axis for transporting the coffee beans from the metering chamber into the grinder and for grinding the coffee beans. Preferably the grinder is positioned centrically with respect to the metering chamber. Preferably, the coffee brewing apparatus is provided with a control device, which advantageously is arranged for controlling the first motor and/or the grinder. Said the control device can be arranged such that, in use, in a first step the metering chamber is filled with coffee beans and that in a second step which follows after the completion of the first step the grinding device is activated for emptying the metering chamber and for grinding coffee beans which were collected in the metering chamber during the first step.

The invention also relates to a cartridge of a coffee beverage system further including a coffee brewing apparatus wherein the coffee bean packaging cartridge can be removable connected to the coffee brewing apparatus, the coffee bean packaging cartridge being arranged for holding and supplying multiple servings of coffee beans, the coffee beans packaging cartridge including:

a container comprising an interior volume and at least one exit opening defining a coffee bean outlet, the interior volume holding coffee beans;

transportation means adapted for enabling transportation of the coffee beans from the interior volume towards the exit opening of the cartridge;

wherein the coffee brewing apparatus comprises an entrance opening for receiving coffee beans which are transported with the aid of the transportation means towards the exit opening, a grinder for grinding coffee beans which have entered the coffee apparatus via the entrance opening and a brewing device for brewing coffee on the basis of ground coffee obtained by means of the grinder, wherein the system is further provided with a metering chamber for receiving coffee beans which are transported with the aid of the transportation means into the metering chamber. Preferably the metering chamber is divided in a first chamber portion which is part of the cartridge and a second chamber portion which is part of the coffee brewing apparatus. Preferably, when the system is in use the metering chamber will hold a dosed amount of coffee beans. Preferably the transportation means comprise a part which is movable relative to the metering chamber for transporting the coffee beans towards the metering chamber upon driving of said transportation means. After the grinding, the brewing device may be activated for brewing coffee based on the ground coffee and on heated water.

Further advantageous aspects of the invention will become clear from the appended description of preferred embodiments.

BRIEF DESCRIPTION OF THE DRAWINGS

The invention will now be described in reference to the accompanying drawings, in which.

DESCRIPTION OF EXEMPLARY EMBODIMENTS

Figure 1:
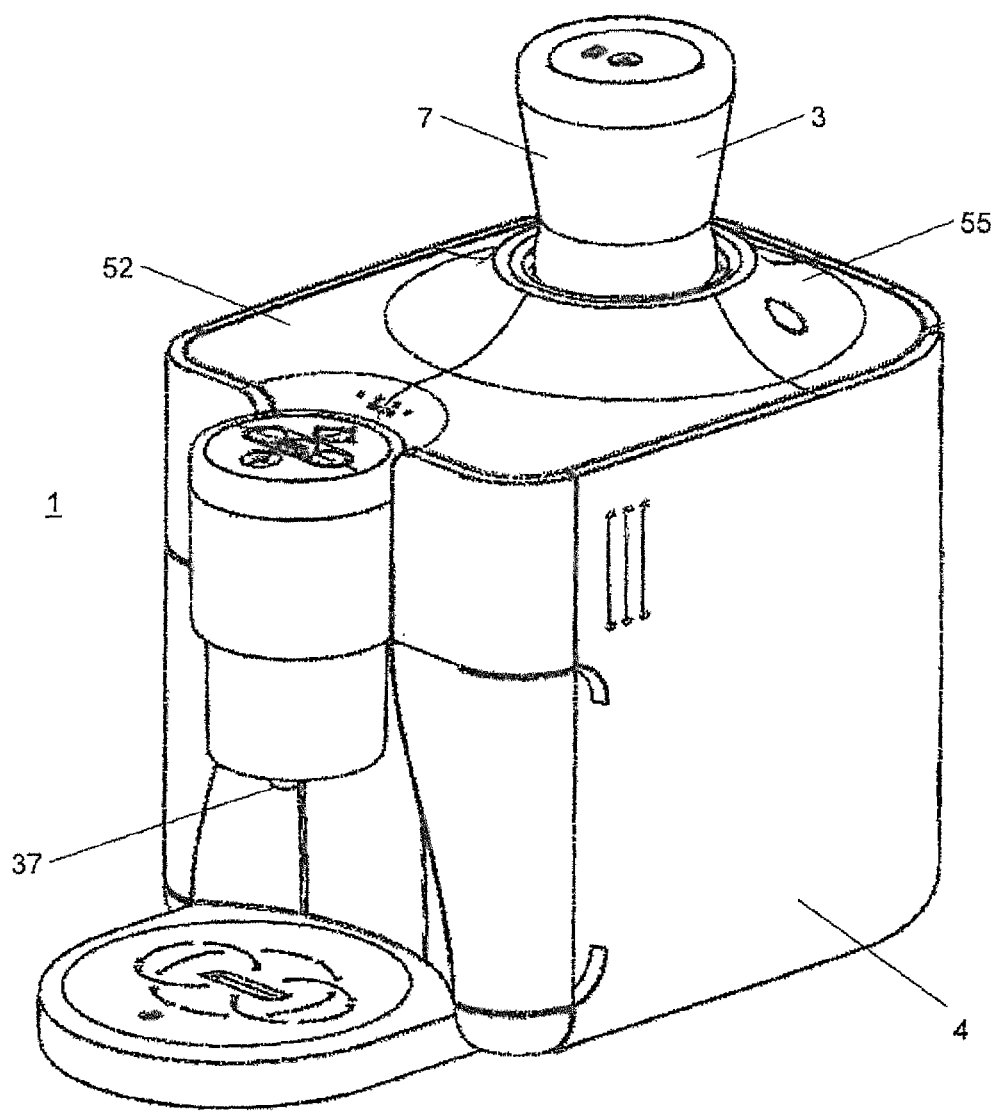
FIG. 1 shows a perspective view of an embodiment of the coffee brewing system according to the present invention with the coffee bean packaging cartridge mounted to the coffee brewing apparatus.
Figure 2:
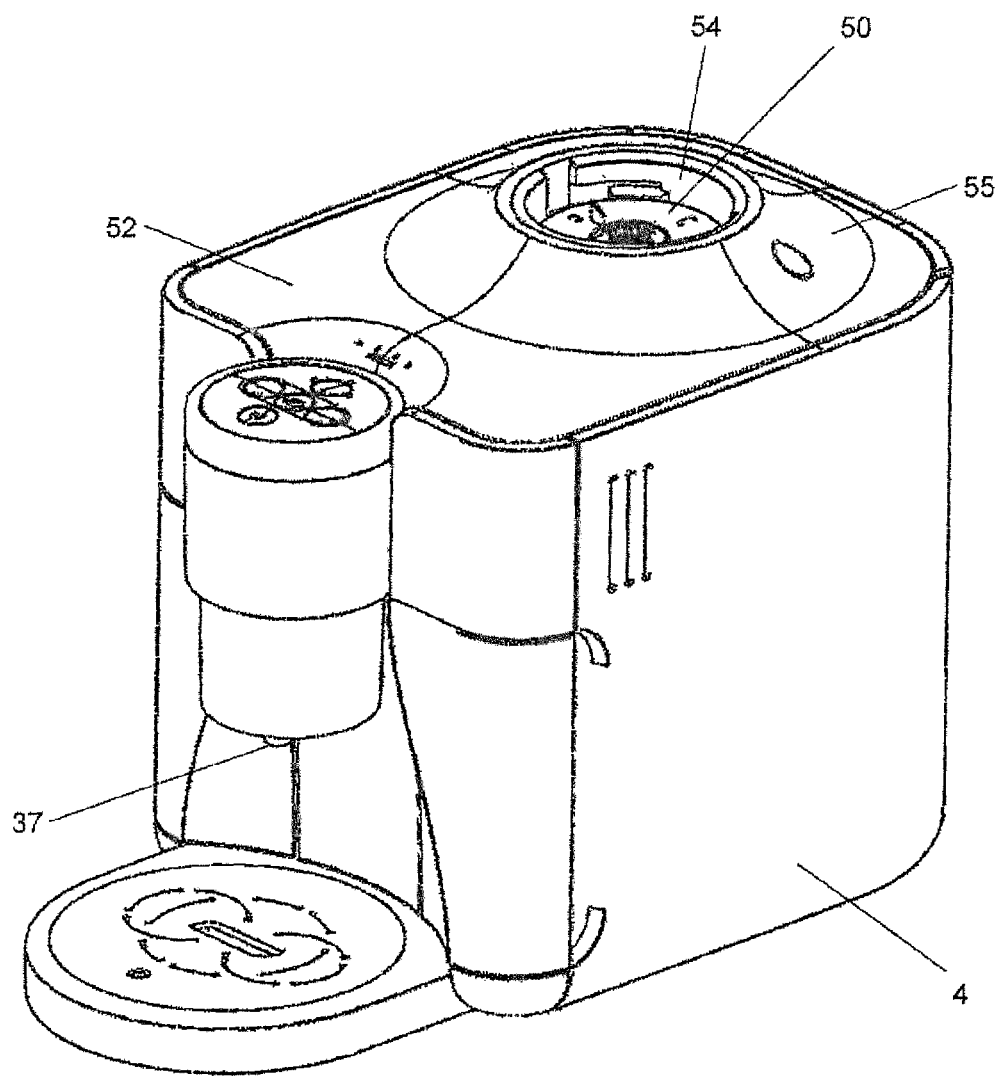
FIG. 2 shows a perspective view of an embodiment of the coffee brewing system according to the present invention without the coffee bean packaging cartridge mounted to the coffee brewing apparatus.

In FIG. 1 a system 1 for preparing coffee beverages is shown. The system 1 includes a coffee bean packaging cartridge 3 and a coffee brewing apparatus 4. The coffee bean packaging cartridge 3 is removably connected to the coffee brewing apparatus 4. FIG. 2 shows the coffee brewing apparatus without the coffee bean packaging cartridge 3 mounted thereon. The coffee bean packaging cartridge 3 comprises a container 7 comprising an interior volume for containing coffee beans and an exit opening. These coffee beans are roasted and include generally roasted half beans. Preferably the coffee beans packaging cartridge 3 is closed airtight and/or under vacuum before it is placed on the coffee brewing apparatus 4. Also the coffee bean packaging cartridge 3 can be in the form of a disposable packaging, so that it can be thrown away after it has been emptied.

Figure 3:
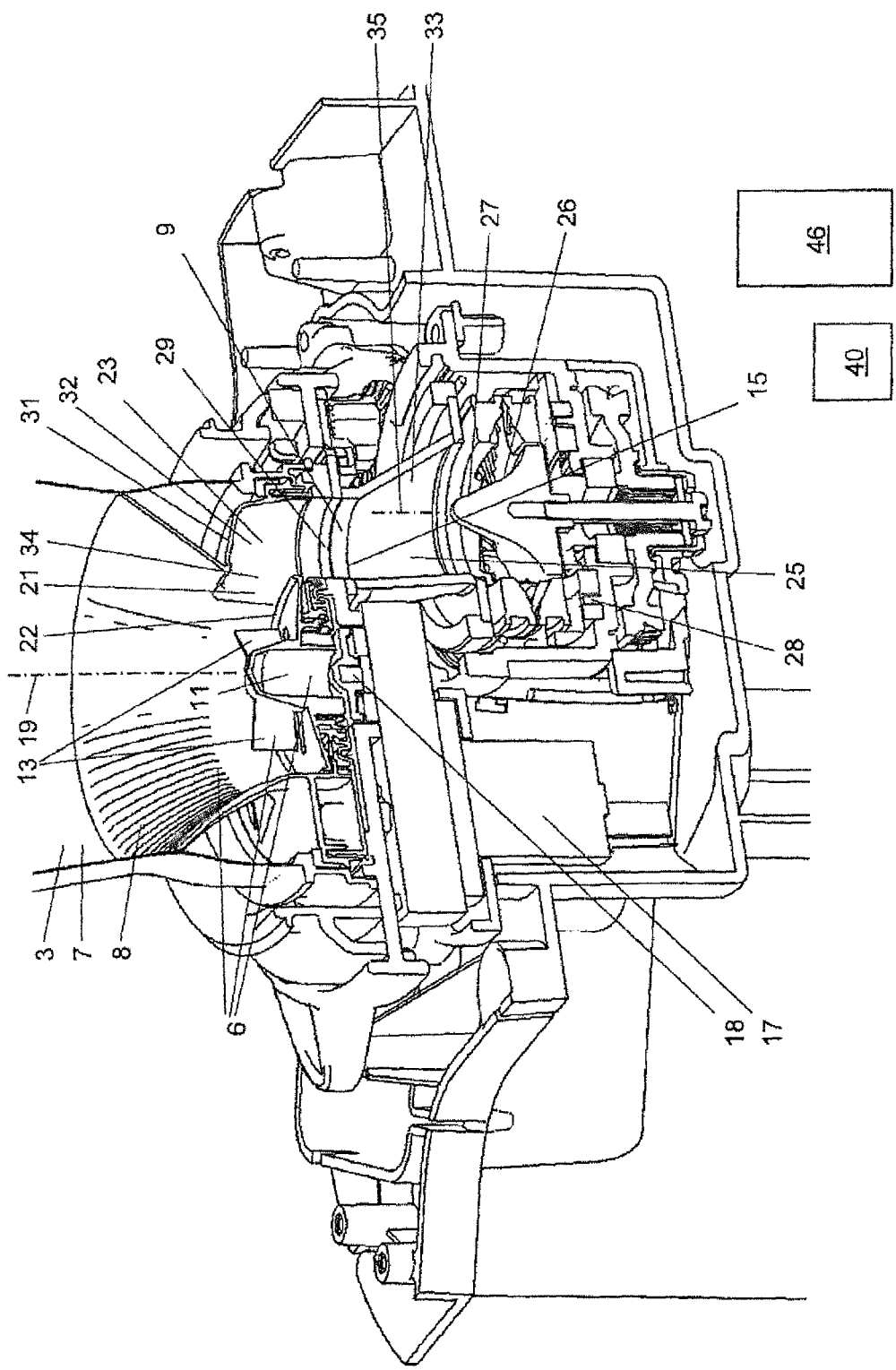
FIG. 3 shows a cross sectional view of a part of the coffee brewing system according to FIG. 1 in perspective.

Referring now to FIG. 3, the coffee beverage system 1 will be described in more detail. The cartridge comprises transportation means 6 for enabling transportation of the coffee beans from the interior volume of the container 7 (only partially visible in FIG. 3) towards the exit opening 29 of the cartridge 3. The coffee apparatus is provided with an entrance opening 9 for receiving coffee beans which are transported by means of the transportation means towards the exit opening 29. The exit opening 29 extends above the coffee bean entrance opening 9 of the coffee brewing apparatus 4.

A lower part of the container 7 comprises a funnel 8 which forms part of the transportation means 6. The beans of the coffee bean packaging cartridge 3 are guided by means of the funnel 8 towards the exit opening 29 of the cartridge. The transportation means further comprise an impellor 11 having several flexible vanes 13. Upon driving the transportation means, in this example by rotating the impellor around a second axes 19 extending in a vertical direction the coffee beans are transported towards the exit opening 29.

The system further comprises a metering chamber 15. The metering chamber is divided in a first chamber portion 23 which is part of the cartridge and a second chamber portion 25 which is part of the coffee brewing apparatus. The first chamber portion is located above the second chamber portion. The first chamber portion comprises the exit opening 29 of the cartridge and the second chamber portion comprises the entrance opening of the coffee apparatus. The first chamber portion is provided with an upstanding side wall 32 comprising an inlet opening 21 for letting pass coffee beans into the metering chamber which coffee beans are transported by means of the transportations means towards the exit opening of the cartridge. The transportation means are thus configured for transporting the coffee beans towards and into the metering chamber 15 of the coffee beverage system 1 upon driving of the transportation means. This driving is performed by means of a first motor 17 of the coffee apparatus, driving a drive shaft 18 of the coffee apparatus extending along a vertical axis 19. Due to the driving, the impellor 11 and the vanes 13 rotate around the second vertical axis 19. In this way, the coffee beans are driven in a horizontal direction to the inlet opening 21 of the metering chamber 15. The cartridge comprises a small trickle through edge 22 to avoid the uncontrolled entering of coffee beans in the metering chamber 15 when the impeller 11 is not rotating. The metering chamber 15 comprises the first chamber portion 23 in the cartridge 3 (upper portion of the metering chamber) and the second chamber portion 25 (lower portion of the metering chamber) in the brewing apparatus 4. The bottom 26 of the metering chamber at least comprises a bottom portion 27 which is part of a grinder 28 for grinding coffee beans. The coffee beans leave the first chamber portion 23 and thereby the cartridge 3 via the exit opening 29 of the cartridge 3 and enter the second chamber portion 25 and thereby the coffee brewing apparatus via the entrance opening 9. The size of the metering chamber is limited by a top wall 31, the bottom 26 and an upstanding side wall 32. The upstanding side wall 32 comprises the upstanding side wall 34 of the first chamber portion and an upstanding side wall 33 of the second chamber portion. The second chamber portion comprises about 100-X % of the volume of the metering chamber and the first chamber portion comprises about X % of the volume of the metering chamber wherein X is in the range of 2-50, preferably in the range of 5-40, more preferably in the range of 15-30.

Figure 3B:
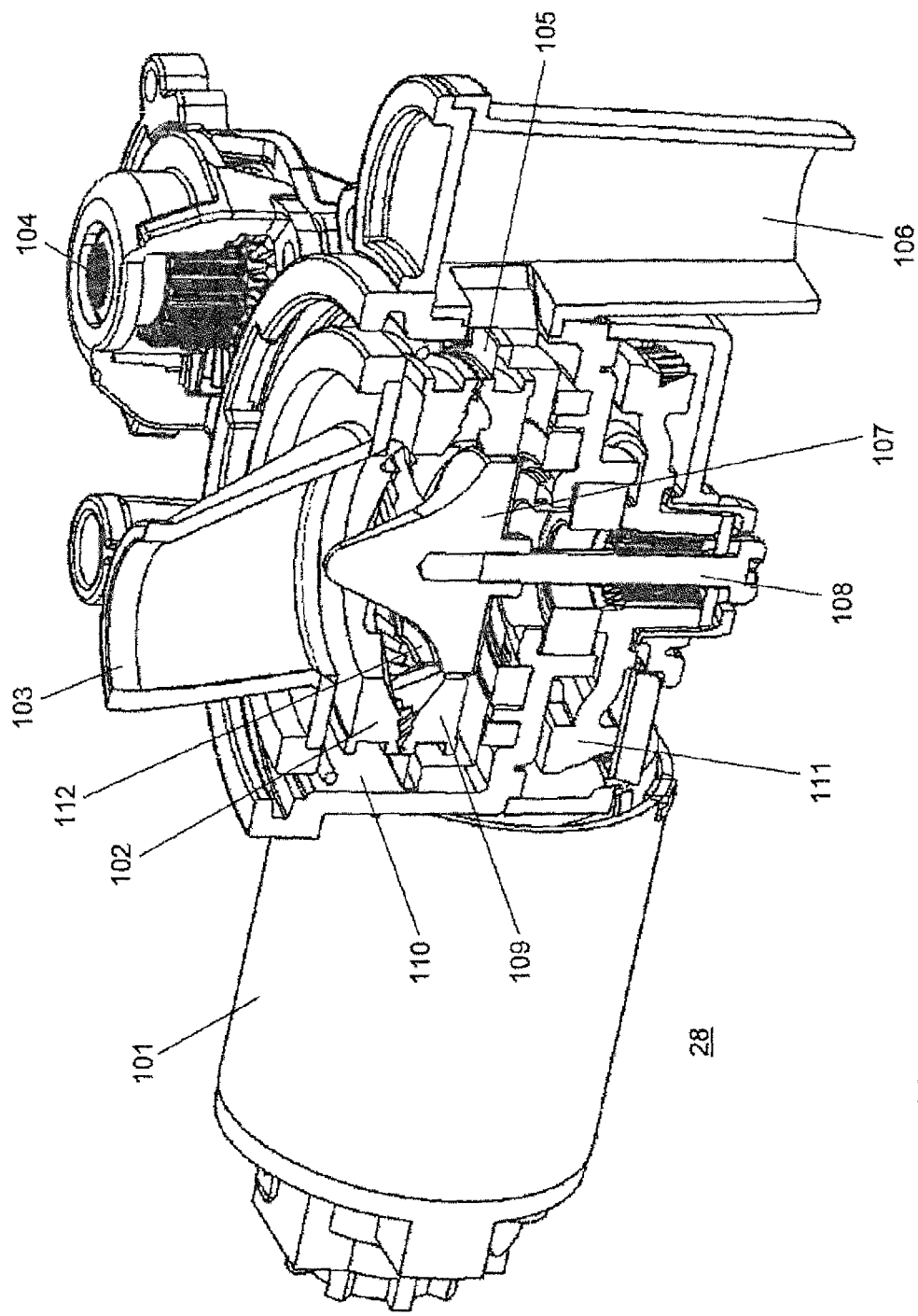
FIG. 3B shows a cross sectional view of the grinder used in the coffee brewing system according to FIG. 1 in perspective.
Figure 3C:
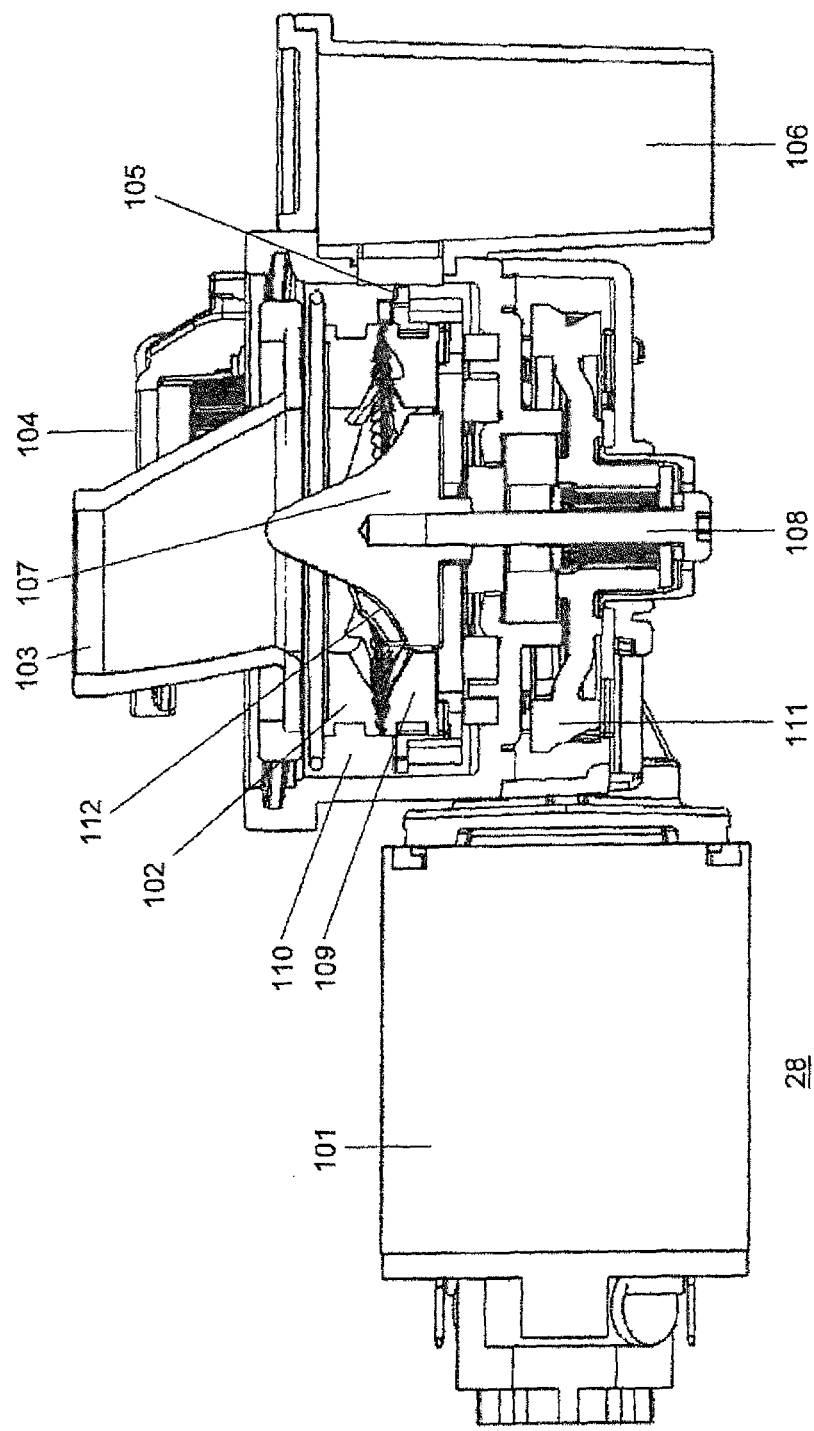
FIG. 3C shows a cross sectional view of the grinder used in the coffee brewing system according to FIG. 1.

The bottom part 27 of the metering chamber has a conical shape such that the bottom portion extends downwardly in a direction extending perpendicular to and away from a vertical axis 35. The grinder 28 in this embodiment is positioned centrically with respect to the second chamber portion 25. Referring now to FIGS. 3B and 3C, the grinder will be described in more detail. The grinder comprises a second motor (grinder drive motor) 101 and an upper grinding disk/wheel 102, which may be ceramic or steel. The upper grinding disk/wheel is rotationally fixed in its position. Furthermore, the second chamber 103 of the metering chamber is shown (referred to by reference 25 in FIG. 3), which works as dosing funnel. The grinder furthermore comprises a manual adjustment lock 104 to adjust the grind fineness setting by the consumer. The upper grinding disk 102 is moved up or down in respect to the lower grinding disk/wheel 109 when this key is turned. When the adjustment lock is operated, the upper grinding disk moves up and down and the lower grinding disk stays in place. In this way the size of the grind at the exit of the grinding disks, i.e. where they almost touch the outside of the grinder, is determined. The grinder furthermore comprises an exit location 105 for ground coffee out of the circular transport channel 110 into the ground coffee chute 106. The ground coffee chute is a funnel pointing downwards into the brewing device 46 of the coffee brewing apparatus, which is open on the top and placed exactly below this chute when grinding. A rotating drive cone 107 (referred to as bottom part with conical shape 27 of the metering chamber in FIG. 3) is fixed on the main drive shaft 108. This cone ensures the movement and guidance of the beans out of the metering chamber into the grinding section consisting of the upper grinding disk 102 and the lower grinding disk 109, which may be ceramic or steel. The upper grinding disk 102 and the lower grinding disk 109 have a suitable milled shape for grinding the coffee beans, as is well known in the art. The main drive shaft drives the lower grinding disk 109 and the rotating drive cone 107. There is formed a circular transport channel 110, which transports the ground coffee exiting out of the slit between upper and lower grinding disk to the exit location 105. The shape of the channel results in a "no contamination" grinder, wherein virtually no coffee beans/ground coffee remains after finishing the grinding. Furthermore, the grinder comprises a motor transmission/gear 111 and a cone protrusion 112 to force the beans between the grinder disks.

The lower grinding disk 109 extends around rotating drive cone 107 and the upper grinding disk 102 extends above the lower grinder disk 109. The grinder is rotationally driven by motor 101 resulting in the rotation of the drive cone 107 and the lower grinding disk 109. Due to the shape of the cone protrusion 112 upon driving the drive cone 107 and the lower grinding disk coffee beans are moved in an outwardly extending radial direction between the lower grinding disk 109 and the upper grinding disk 102. Because a vertical distance between the lower grinding disk 109 and the upper grinding disk 102 decreases in the outwardly extending radial direction the beans are crunched and cut into ground coffee.

As explained, grinder 28 supplies ground coffee to a coffee brewing device 46 (schematically shown in FIG. 3) of the coffee apparatus. The coffee brewing device is arranged to receive a supply of water to extract a coffee beverage from the ground coffee. The coffee beverage is discharged from a coffee beverage exit 37 from the coffee brewing apparatus into a cup or like household receptacle. A water supply can be arranged to supply water to the coffee brewing device under pressure for espresso type coffee beverages or may provide a drip feed to the extraction system formed by coffee brewing device.

Before operating the coffee beverage system, the user has to connect the coffee bean package cartridge 3 to the coffee brewing apparatus 4. FIGS. 4-9 show an embodiment of the connection means of the coffee beverage system, which are used for this purpose.

Figure 4:
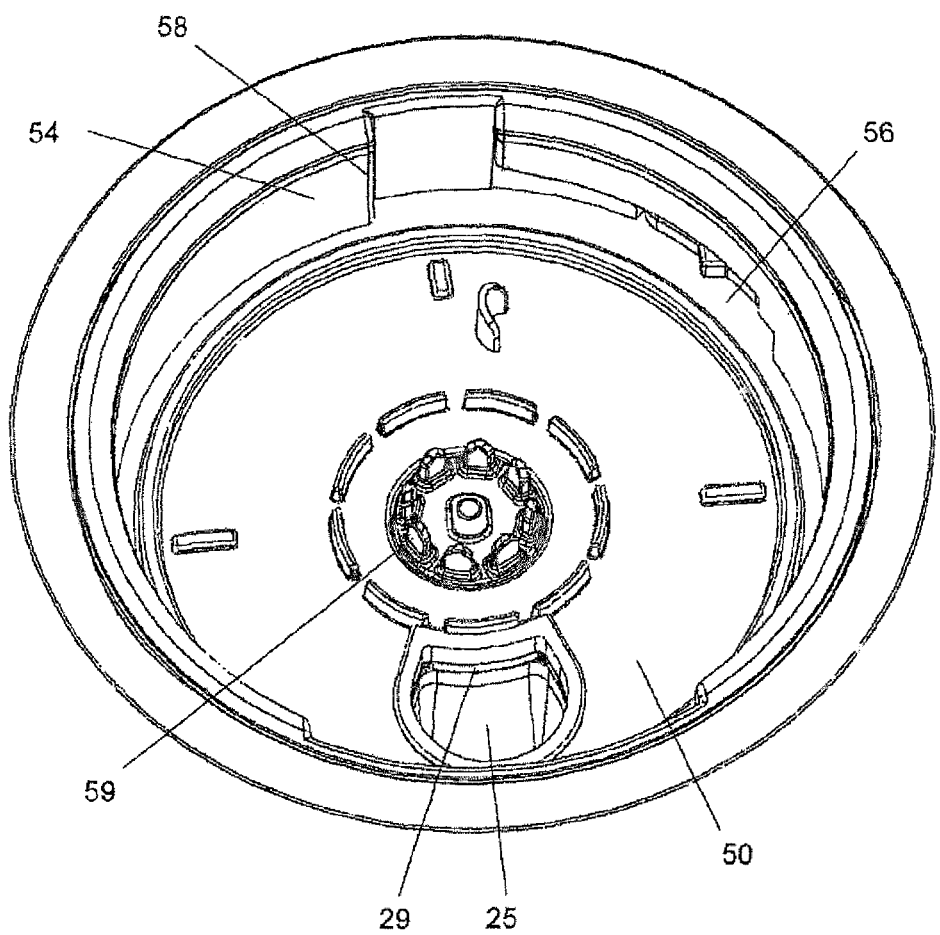
FIG. 4 shows a perspective detail view of the upper part of the coffee brewing apparatus of FIG. 2.
Figure 4B:
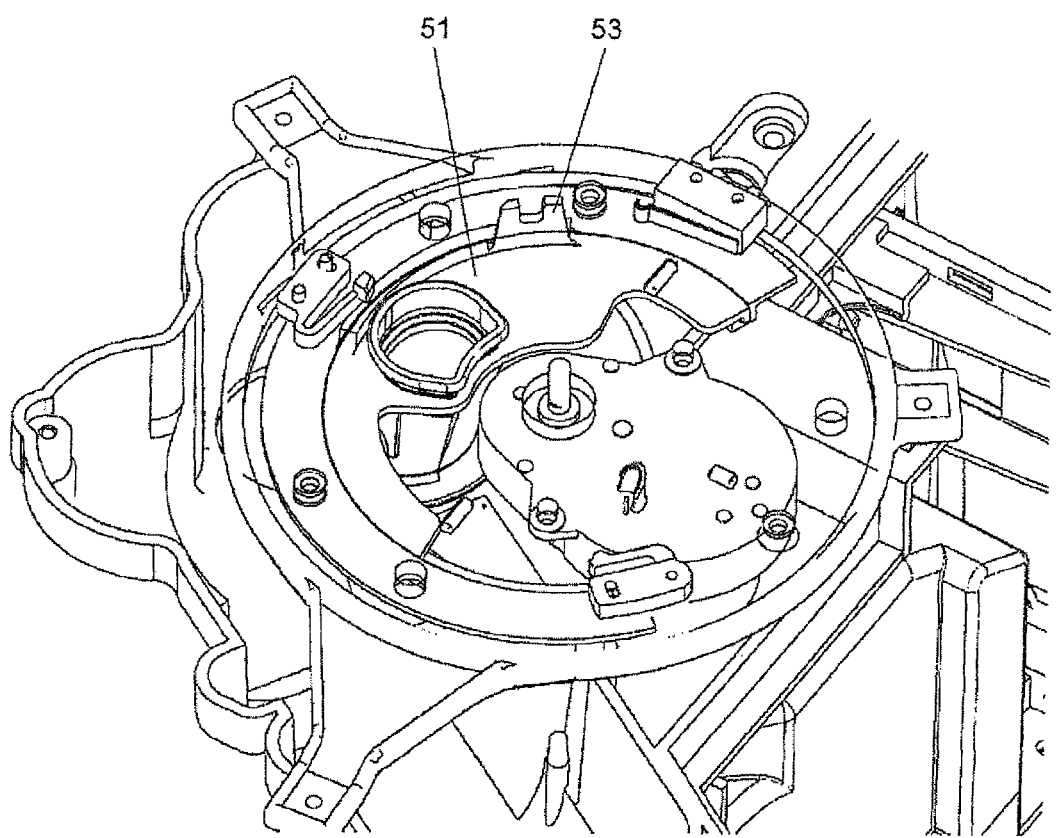
FIG. 4B shows a perspective detail view of the upper part of the coffee brewing apparatus of FIG. 2 with a closing plate in open position.

Referring now to FIG. 4, the connection means comprise a recess 50 at an upper side 52 of the coffee brewing apparatus 4. The recess 50 is surrounded by a side wall 54 protruding from the upper side of the coffee brewing apparatus 4. The user should place the corresponding part, shown in FIGS. 5A, 5B, 6, 6B, 6C, 7A, 7B, 7C, 8 and 9, at a lower side of the coffee bean packaging cartridge into the recess. The bayonet elements to be described later of the coffee bean packaging cartridge should be placed in the corresponding openings 58 in the side wall 54 of the recess 50. The user should then rotate the cartridge over 50 degrees until reaching the blocking elements 56 for impeding a further rotation of the coffee bean packaging cartridge. At this position the exit opening 29 of the first chamber portion 23 is aligned with the coffee inlet 9 of the second chamber portion 25. When the cartridge 3 is removed from the coffee brewing apparatus, the second chamber portion 25 in the appliance is closed by means of an appliance closing plate 51 (FIG. 4B) The appliance closing plate is being driven by a protrusion 1686 (FIG. 6C) on the neck of the cartridge which slots into a keyhole 53 on the appliance closing plate as the cartridge is being placed into the openings 58 in the side wall 54 of the recess 50. As the user rotates the cartridge over a 50 degrees angle during placement the closing disk in the consumable and the closing plate in the appliance are opened, simultaneously.

Figure 5A:
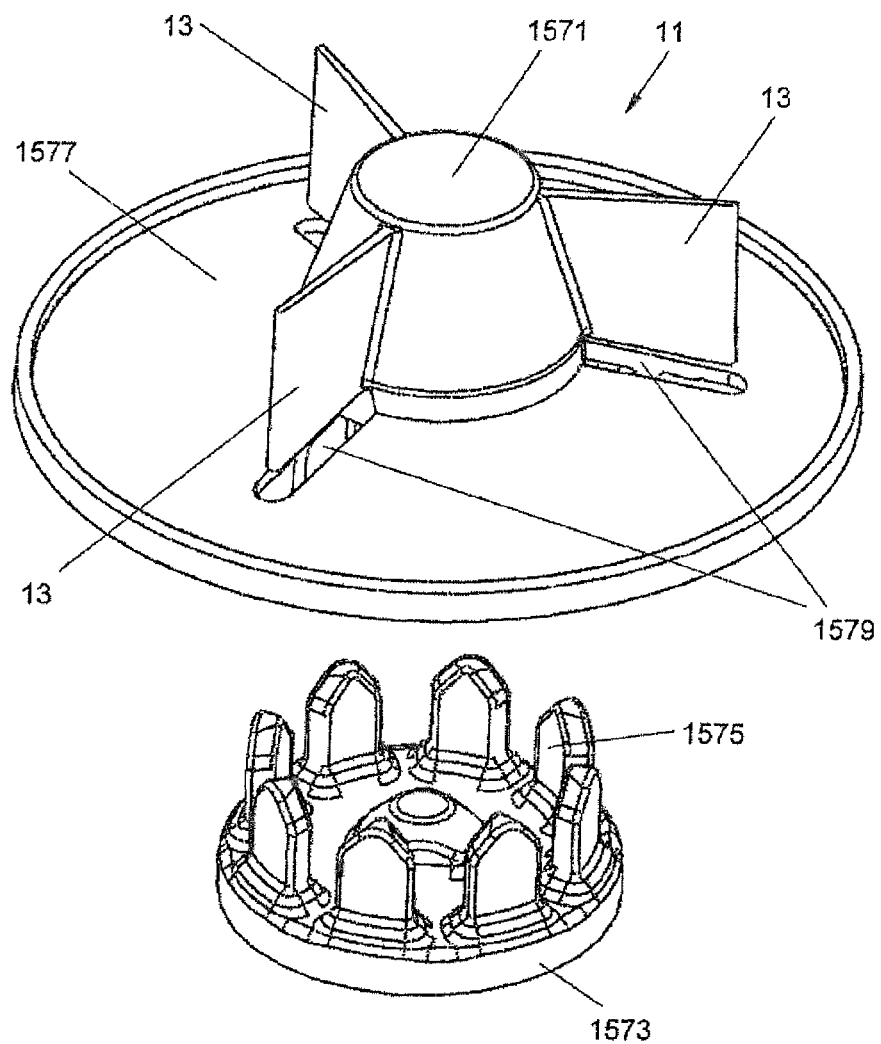
FIGS. 5A and 5B are two isometric exploded views of an impellor used in the coffee bean packaging cartridge together with a drive shaft coupling end.
Figure 5B:
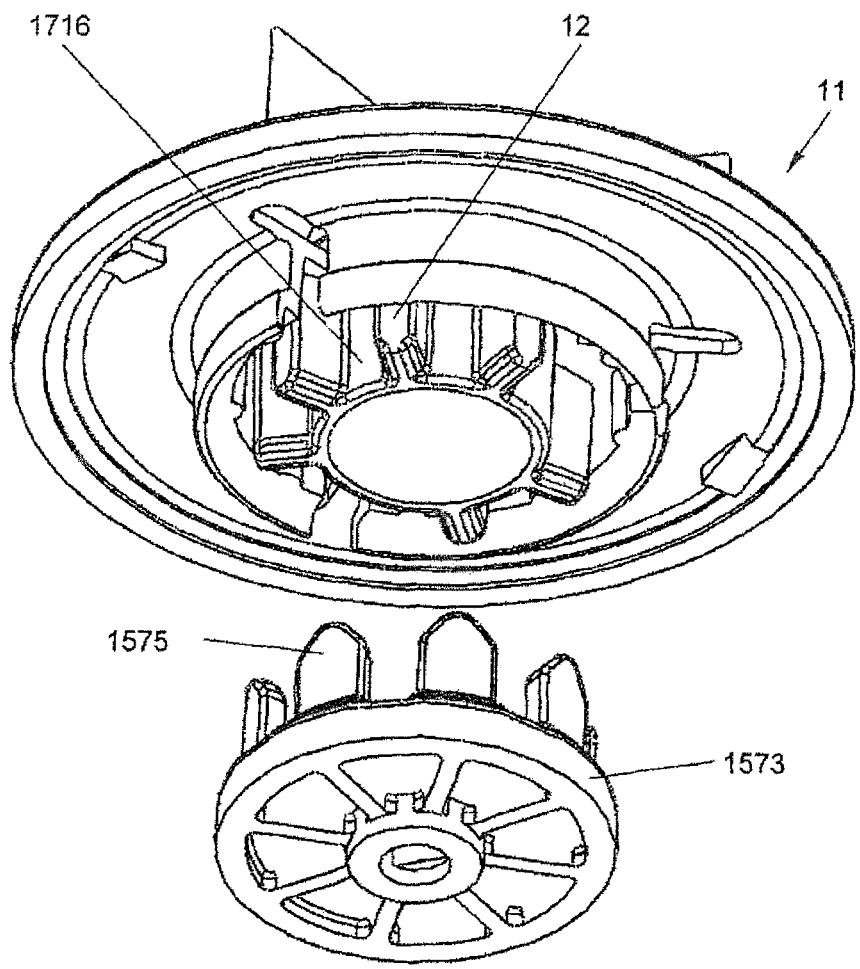

One suitable form of impellor 11 is shown in somewhat more detail in FIGS. 5A and 5B. To prevent the impellor 11 to get jammed by coffee beans that become locked between the perimeter aperture and radially extending vanes 13, such vanes 13 are preferably made from a resilient material. It is also possible to make the entire impellor 11 from a yieldable resilient material. The impellor 11 has a hollow hub portion engageable by a drive shaft end 1573 of a coffee preparing appliance. The drive shaft end 1573 may have a number of keys 1575 (preferably 4, 6 or 8) for engagement with corresponding protrusions, or keys in the interior of hollow hub 1571. To facilitate engagement of the impellor 11 and the drive shaft end upon placing of the cartridge on the appliance the number of keys may differ between the drive shaft end 1573 and the hollow hub 1571. As illustrated in FIG. 5A the vanes 13 do not extend to the perimeter edge of the impellor 11, which may prevent beans from becoming jammed between the vanes 13 and the perimeter aperture. As indicated hereinabove the vanes may also be of a flexible material and to provide more flexibility to the vanes the vanes are conveniently also unattached to the impellor base 1577, by leaving a gap 1579. To fill the metering chamber some fifteen revolutions of the impeller 11 will normally suffice. However, to ensure filling under even adverse conditions, it may be convenient to allow for some extra revolution such as thirty or twenty-five in total. For filling of the dosing volume the conveying impeller 11 including both the impellor base 1577 (bottom) and the vanes 13 is rotated with a rotational speed in the range of 100 to 500 rpm, and preferably between 250 and 300 rpm. Due to the centrifugal force created by the rotation of the impellor base 1577 and the rotation of the vanes the coffee beans are driven in an outward direction towards the inlet opening 21 of the metering chamber. Once the filling of the dosing volume has been accomplished, the appliance will switch from driving the impeller 11 to driving its grinder. With the impeller 11 immobilised the metering chamber will gradually empty into the grinder. Because the impeller 11 is inactive, no beans will escape from container 7, also because of the presence of the trickle through edge 22.

Figure 6:
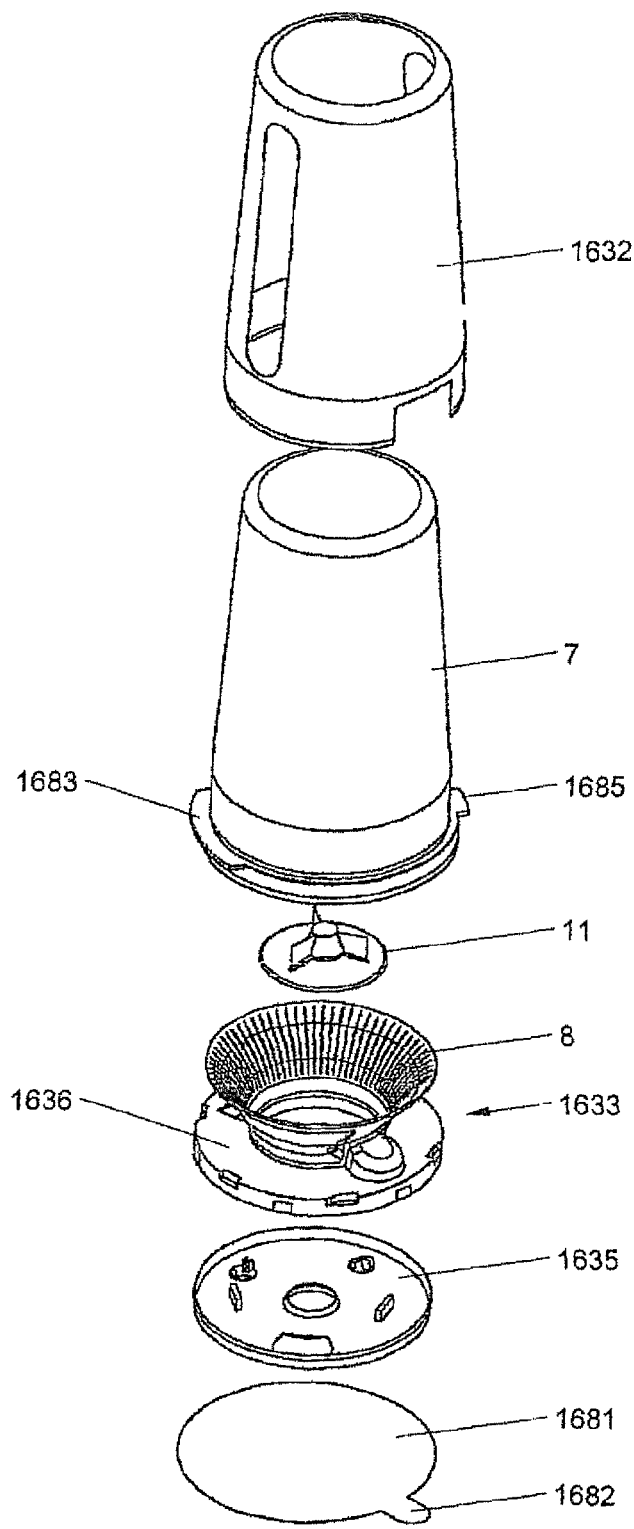
FIG. 6 is an exploded isometric view of a coffee bean packaging cartridge according to an embodiment of the invention.
Figure 6B:
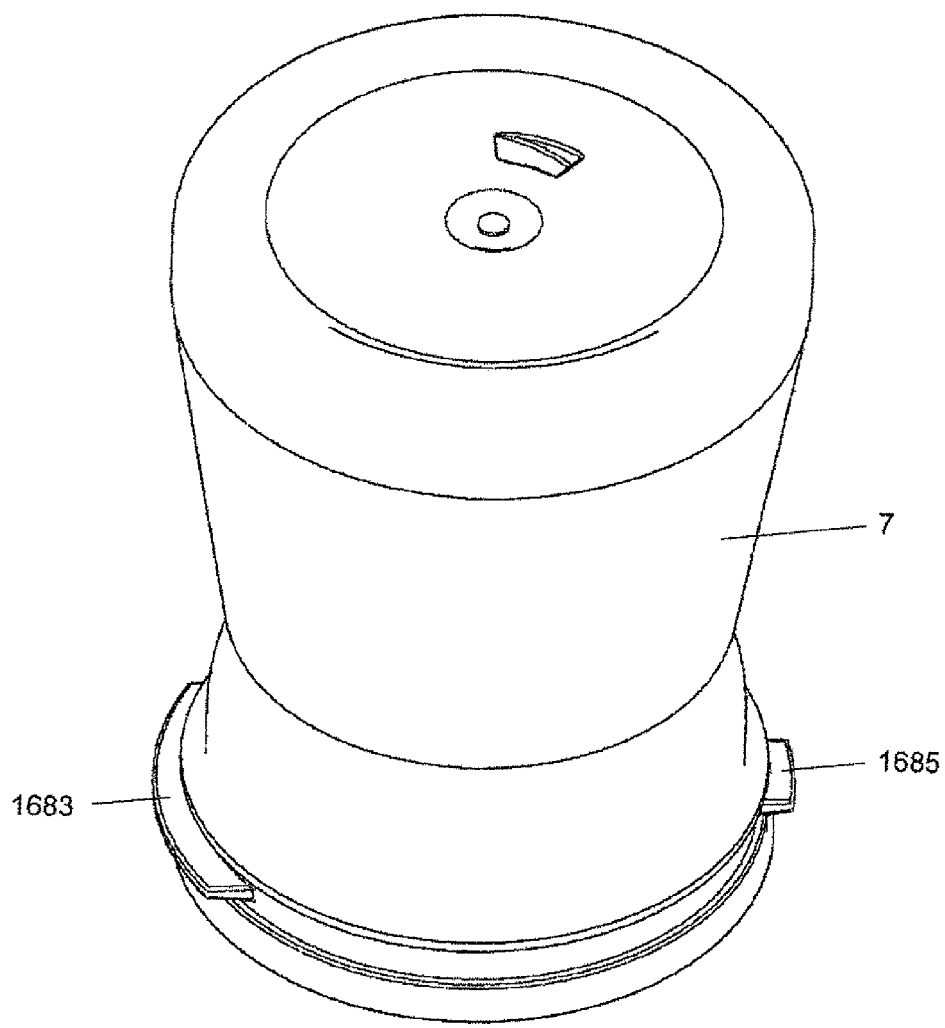
FIGS. 6B, 6C and 6D show two different perspective views of the coffee bean packaging cartridge shown in FIG. 6
Figure 6C:
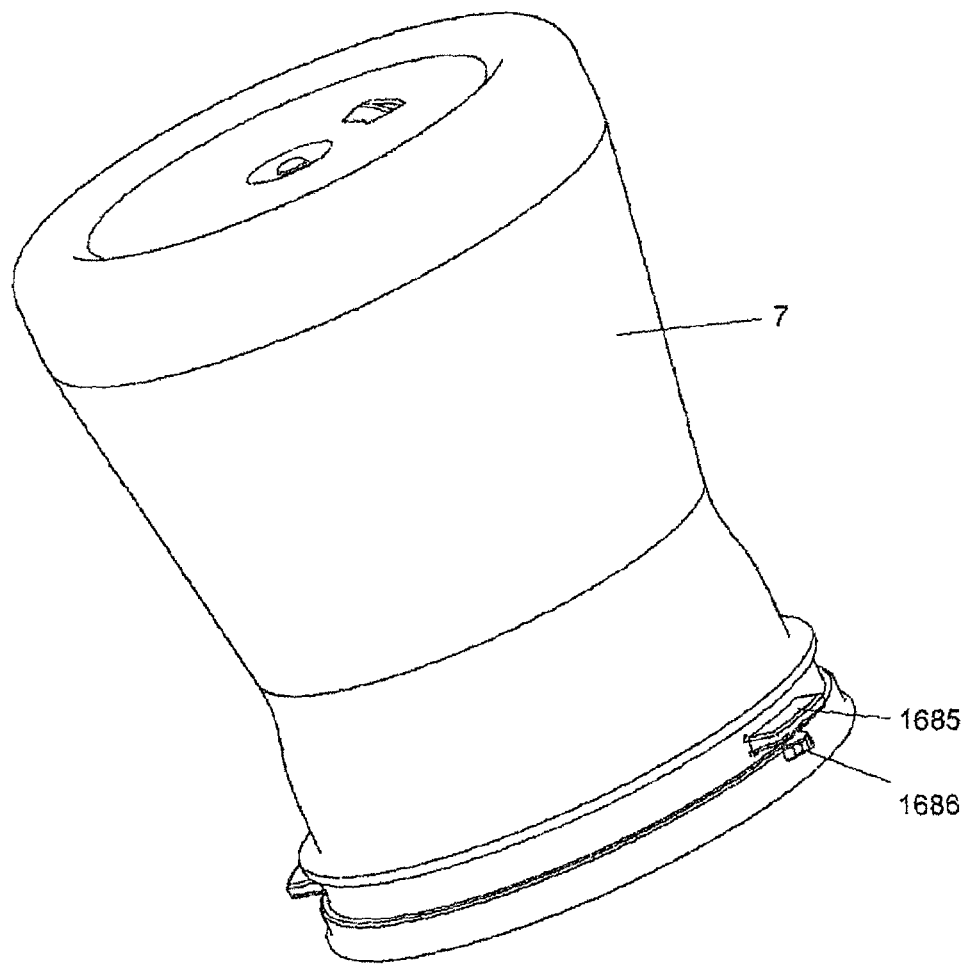

Referring to FIGS. 6, 6B and 6C an embodiment of the coffee bean packaging cartridge 3 is shown in an exploded arrangement and perspective views. This packaging cartridge includes the container 7 defining an interior volume for coffee beans. The container 7 is preferably made from a transparent material so that its contents can be seen. Optionally, the container 7 may be partially covered by an outer sleeve 1632 which may be printed with a description of the kind of coffee beans inside and may also be apertured to reveal a translucent portion of the container 7. The container 7 is also provided at a lower end thereof with bayonet formation 1683, 1685 for coupling with the openings 56 in the side wall 54 of the recess 50 of the coffee brewing apparatus 3. Inserted into an open bottom end of container 7 is a closure member 1633. The closure member 1633 has the ribbed funnel 8 for guiding coffee beans towards the impellor 11 and a base flange 1636. A rotatable closure disk 1635 is rotatably connectable with respect to the base flange 1636 of the closure member 1633. The closure member 1633 and the rotatable closure disk together form an interface between the cartridge and a coffee brewing apparatus. The assemble cartridge can be sealed against deterioration from the ambient air by a sealing membrane 1681 that attaches to the perimeter edge of the container 7. The sealing membrane and barrier foil 1681 may again be equipped with a conventional one-way pressure relief valve for venting excess pressure from gases emanated from freshly roasted beans to the exterior of the packaging cartridge. Preferably such a venting valve should open at a pressure of between 0.1 bar and 0.5 bar to prevent deformation of the container by inflation. To facilitate removal of the sealing membrane 1681 before placing the cartridge on a brewing apparatus, a pulling tab 1682 may be provided.

Figure 7A:
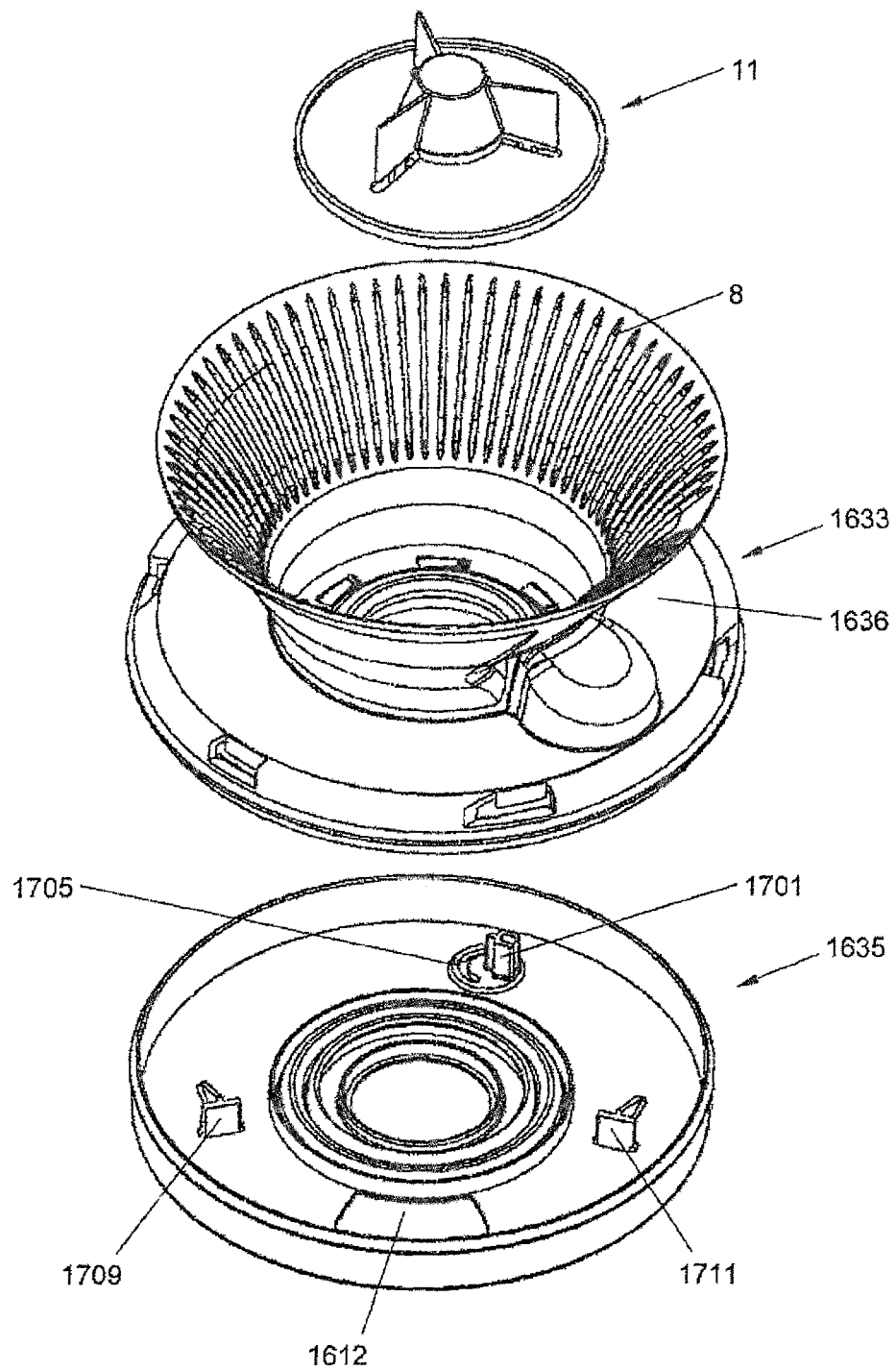
FIG. 7A is a detailed exploded isometric view of the bottom part of the coffee bean packaging cartridge of FIG. 6.
Figure 7B:
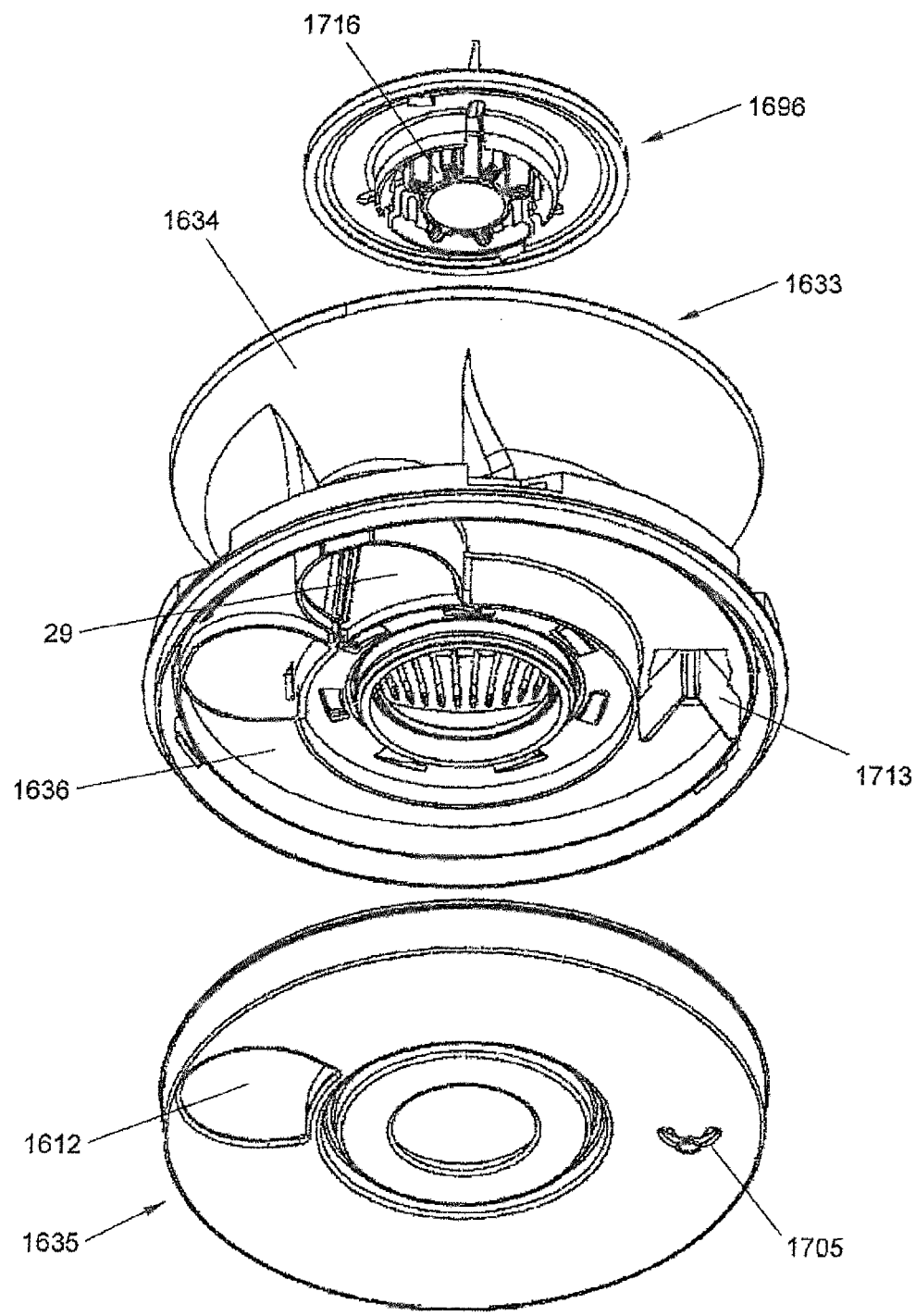
FIG. 7B is a detailed exploded view of the bottom part of FIG. 7A as seen in an opposite direction.
Figure 7C:
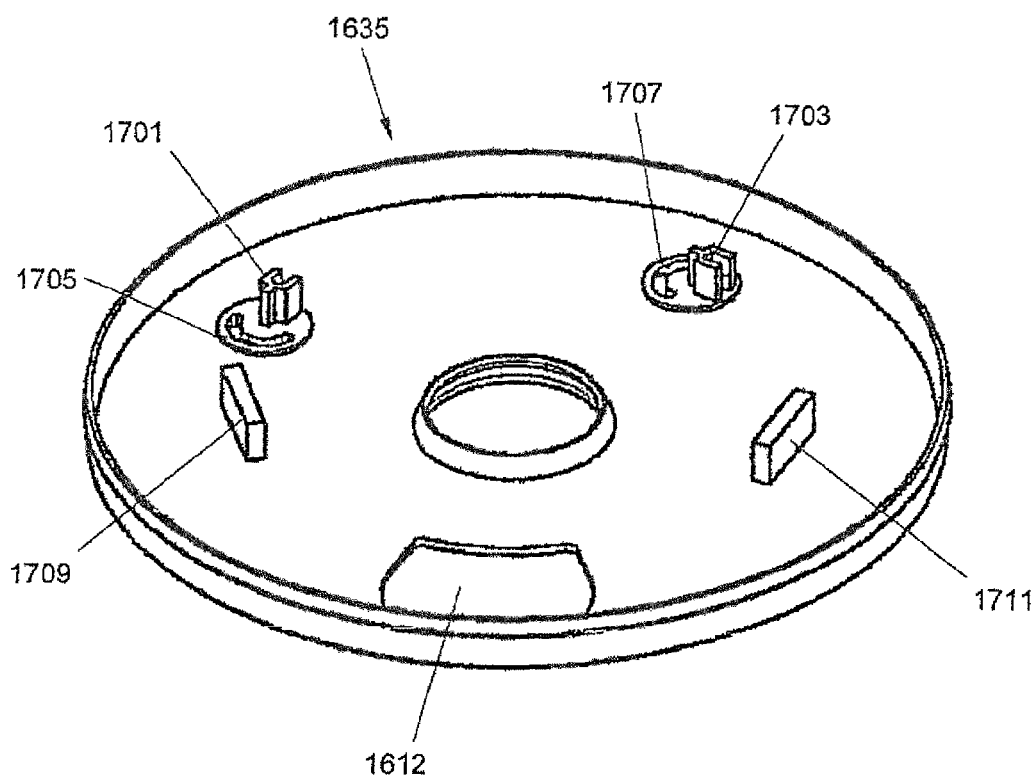
FIG. 7C is a perspective view of a closing plate of the bottom part shown in FIGS. 7A and 7B.

The interface forming bottom parts of the cartridge are separately shown in more detail in FIGS. 7A, 7B and 7C. The ribbing on funnel 8 as further seen in the exploded view of FIG. 7A is useful in preventing sticking of coffee beans to the surface of the funnel 8.

By appropriate spacing between the successive ribs on funnel 8 it is possible to minimise the contact surface between the beans and the funnel surface. As the skilled person will recognise, such ribbing is merely one of various ways to reduce the contact surface and protruding bulges may be equally effective. Also the inclination given to the funnel may be subject to variation, but an angle in excess of 30 degrees, up to 90 degrees has been found effective.

The rotatable closing disk 1635 has an aperture 1612, which upon appropriate rotation can register with exit opening 29 of the closure member 1633 (see FIG. 7B). The closing disk 1635 on its upper surface has protruding there from a first detent 1701 and a second detent 1703 (see FIG. 7C). The first abutment is bordered by semi-circular slots 1705 and 1707, respectively. Additionally, protruding from the upper surface of the rotatable closing disk 1635 is a first abutment 1709 and a second abutment 1711 for limiting rotational movement in respect of the exit opening 29. Further provided on a bottom face of the base flange 1636 of the closure member 1633 is a first pair of latching arms 1713 and a second pair of latching arms (not shown). The first pair of flexible latching arms 1713 is positioned to cooperate with the first detent 1701 in the closed position of the rotatable closure disk 1635. The second detent 1703 and the second pair of flexible latching arms also cooperate together in the closed position of the closure disk 1635 and are optional.

Figure 8:
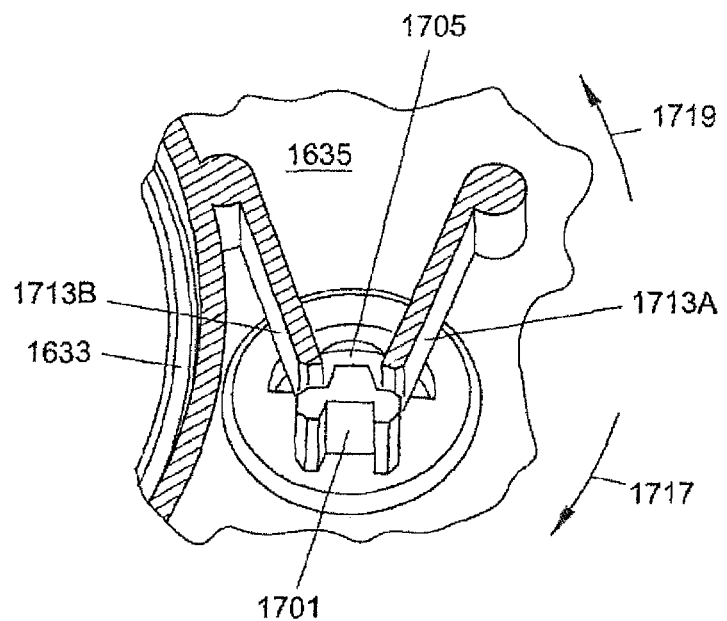
FIG. 8 is a cross-sectional detail of the assembled bottom part.

In reference to FIG. 8 it is shown how the first detent 1701 has been caught behind the converging flexible arms 1713A and 1713B of the first part of flexible arms. The position of the detent 1701, as shown in FIG. 8, has resulted from rotation of the closure disk 1635 in respect of the closure member 1633 in the direction of arrow 1717. Rotation in the opposite direction of arrow 1719 is effectively prevented by the flexible arms 1713A and 1713B engaging the first detent 1701. Accordingly when the cartridge is in the closed position as determined in the partial cross-section of FIG. 8 it may be removed from the apparatus without any risk of spilling beans. Also this latching arrangement ensures that the cartridge is not accidentally opened by rotation of the closure disk 1635.

Figure 9:
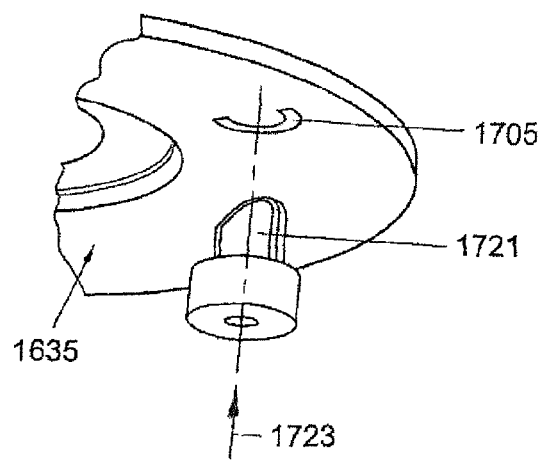
FIG. 9 is a bottom perspective detail of the bottom part of FIG. 7B with a delatching protrusion of the coffee brewing apparatus.

As shown in FIG. 9 an unlocking element 1721, which is part of a coffee brewing appliance, can engage through the semi-circular slot 1705 in the direction of arrow 1723 when the cartridge is placed on the appliance. The unlocking element 1721 has a V-shaped upper contour that forces apart the flexible arms 1713A and 1713B of the first pair of flexible arms 1713. This will then allow rotation of the closure disk 1635 in the direction of arrow 1719 by allowing the first detent 1701 to pass between the spread apart flexible arms 1713A and 1713B. This rotating movement is obtained by manually rotating the cartridge with respect to the appliance to engage the bayonet means 1683, 1685 on the container 7 with the counter bayonet formations 56 on the brewing apparatus.

The operation of the second detent 1703 in respect of the second pair of flexible latching arms is identical and when optionally provided will give additional protection against accidental opening, when not engaged on a coffee brewing apparatus.

Referring to FIG. 4 again, the recess 52 comprises rotatable protruding edges 59 at its center, which are positioned at the end of the driving shaft 18 which is driven by the first motor 17. On these edges the corresponding openings 1716 at the bottom side of the cartridge 3 should be placed. These openings 1716 are formed by a series of protrusions 12 (see FIG. 5B) on the bottom side of the impeller 11. The openings 1716 receive the edges 59 if the cartridge is connected with the coffee brewing apparatus. Thus by rotating the edges 59 the impellor 11 is rotating too.

The upstanding side wall 54 of the recess 52 may be surrounded by a housing 55, as shown in FIGS. 1-2.

The coffee brewing apparatus comprises a control device unit 40 schematically shown in FIG. 3, preferably a microprocessor for controlling the dosing, grinding and brewing process. Thereto, the controller may be connected to a sensor acting as a detection means for detecting an identification element such as a barcode or a RFID label of the coffee bean packaging cartridge 3. Thereby the control device unit cannot only detect the presence or removal of the coffee bean cartridge 3, but also receive information about its contents and/or an identifier which identifies the cartridge 3. Preferably the control unit controls the dosing, the grinding and the brewing (including water supply) in dependence on the identifier that was is read by means of the sensor. It thus becomes possible for the control device unit to adjust the dosing, grinding and brewing process in accordance with the particular coffee bean product offered by the cartridge 3. Such information can be supplied to the control unit by the identification element on the cartridge.

Figure 4C:
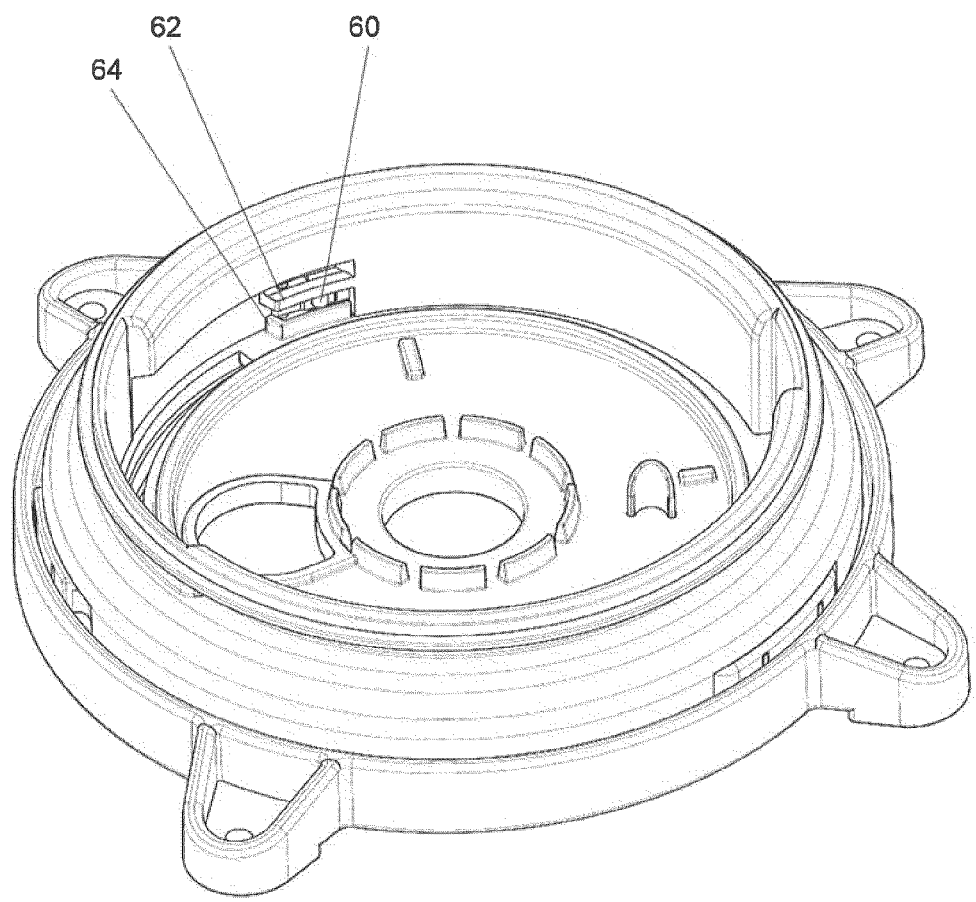
FIG. 4C shows a further perspective detail view of the upper part of the coffee brewing apparatus of FIG. 2.
Figure 6D:
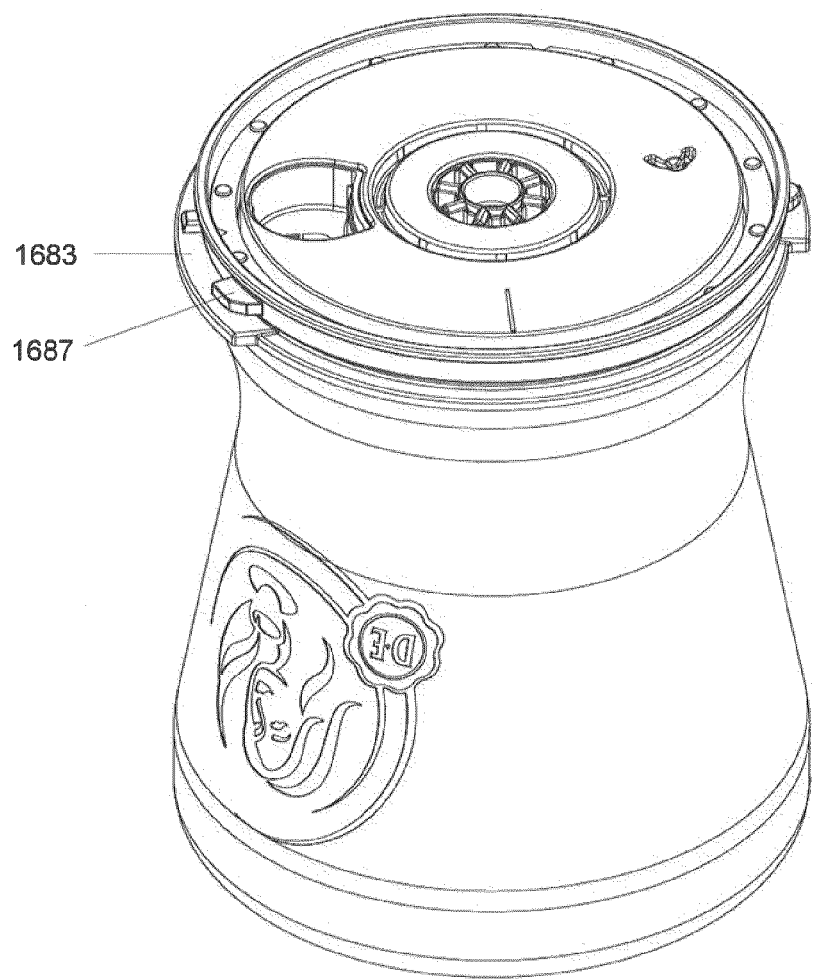
Figure 10:
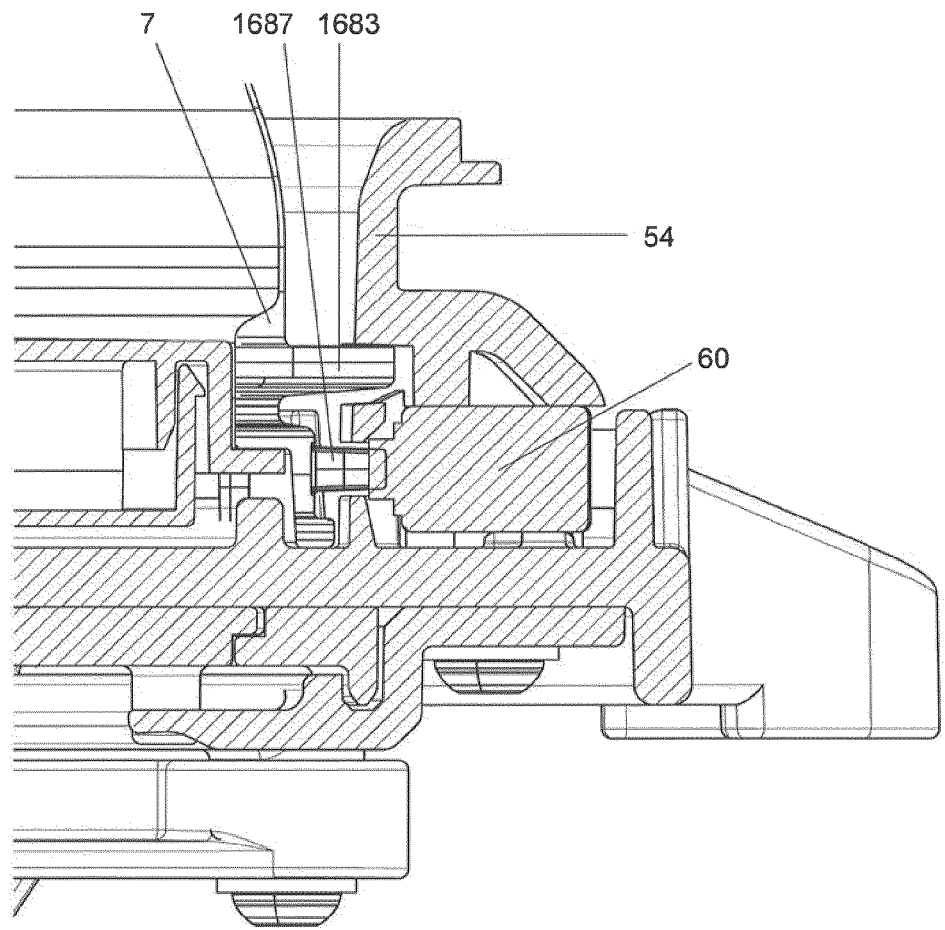
FIG. 10 shows a cross sectional view of the coffee bean packaging cartridge connected to the coffee brewing apparatus.

Alternatively, as shown in FIGS. 4C, 6D and 10, the sensor is arranged to merely detect the presence and removal of a coffee bean packaging cartridge to the coffee brewing apparatus. The sensor used for this purpose may be a micro switch 60 hidden behind a first horizontal segment 62 and a second horizontal segment 64 in the side wall 54 protruding from the upper side of the coffee brewing apparatus 4. This is to prevent the activation of the micro switch with finger or other object. A protruding part 1687 (see FIG. 4C) below the large bayonet element 1683 of the cartridge 3 activates the micro switch, when the cartridge is connected to the coffee brewing apparatus by rotating it to its final position. The protruding part 1687 exactly fits in the slit between the horizontal wall segments 62, 64. This signals the controller that a cartridge is correctly connected to the coffee brewing apparatus. The controller may activate the dosing, grinding and brewing processes only when it has been detected that the cartridge 3 has correctly been connected to the coffee brewing apparatus 4.

According to an embodiment, the controller controls these processes as follows. In a first step the metering chamber is completely filled with coffee beans. Thereto, the controller controls the first motor 17 to drive the transportation means. The transportation means is driven longer than is required for filling the metering chamber with coffee beans. In this example in the first step the transportation means is driven longer than is required for completely filling or at least substantially completely filling the metering chamber (in this application at least substantially means for example for more than 90%). This is possible, because of the use of the flexible vanes 13. The metering chamber is arranged for receiving a portion of coffee beans corresponding to a dosed amount of coffee beans which is preferably necessary for preparing a single serving of coffee beverage, such as a single cup coffee comprising 80-160 ml of coffee. A filled metering chamber comprises in this example one dose of coffee beans. One dose of coffee beans comprises 5-11, preferably 6-8 grams of coffee beans.

Then, in a second step which follows after the completion of the first step, the controller activates the grinder by activating the second motor 101. The grinder is activated longer than is required for emptying the metering chamber and for grinding all the coffee beans which were collected in the metering chamber during the first step. In this example in the second step the grinder is activated longer than required for completely emptying or at least substantially completely emptying the metering chamber (in this application at least substantially completely emptying means for example for more than 90%).

Finally, in a third step which follows after that the second step is completed the controller controls the brewing device to brew coffee based on the ground coffee and on heated water.

Figure 11A:
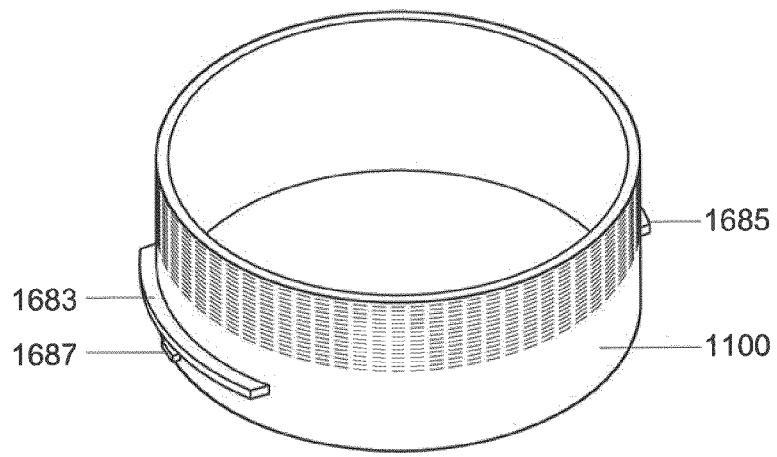
FIG. 11A shows an insert piece of a first type.
Figure 11B:
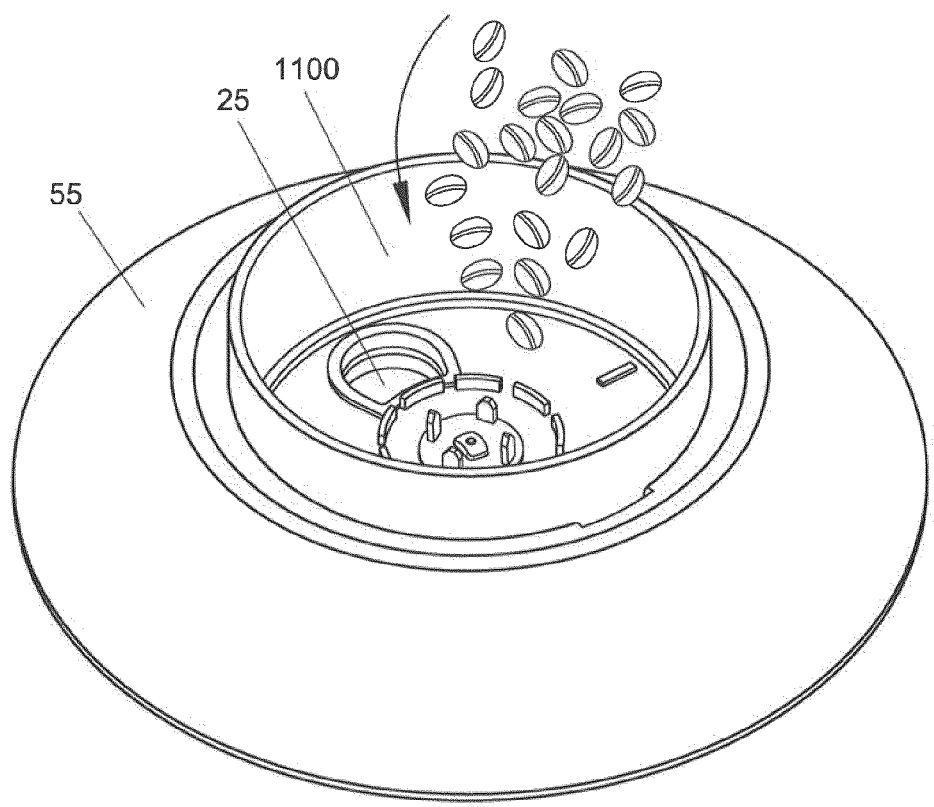
FIG. 11B shows the insert piece of FIG. 11A connected to the coffee brewing apparatus.

The system may further be provided with one or more insert pieces that can be connected to the coffee brewing apparatus in lieu of a coffee bean packaging cartridge. A first type of insert piece 1100 is depicted in FIG. 11A. It is a ring shaped element with at its outer surface the bayonet elements 1683, 1685 as well as the protruding part 1687 for activating the micro switch. It may be connected to the coffee brewing apparatus in the same way as a coffee bean packaging cartridge, i.e. by placing the bayonet elements in the corresponding openings 58 in the side wall 54 of the recess 50 in a initial position and then rotate the insert piece over 50 degrees until reaching the final position. When the insert piece is connected to the coffee brewing apparatus, the corresponding activation of the micro switch by the protruding part 1687 signals to the controller that a device is connected to the coffee brewing apparatus. The controller does not know if the activation of the micro switch is caused by a cartridge or by an insert piece. Therefore, when the insert piece 1100 is connected to the coffee brewing apparatus in the final position, as shown in FIG. 11B, the controller will activate the dosing, grinding and brewing processes, as if there were a coffee bean packaging cartridge connected to the brewing apparatus. So, the insert piece of the first type 1100 may be used to 'unlock' the coffee brewing apparatus.

In an alternative embodiment the insert piece may be a ring shaped element as described above which is integrally provided with a funnel which, when the insert piece is connected to the brewing apparatus, allows a user to manually feed coffee beans or ground coffee into the funnel.

Figure 12A:
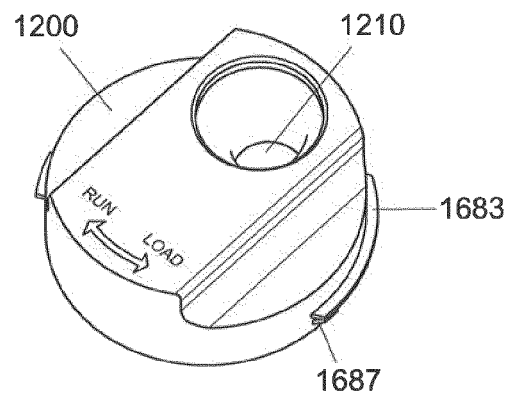
FIG. 12A shows an insert piece of a second type.
Figure 12B:
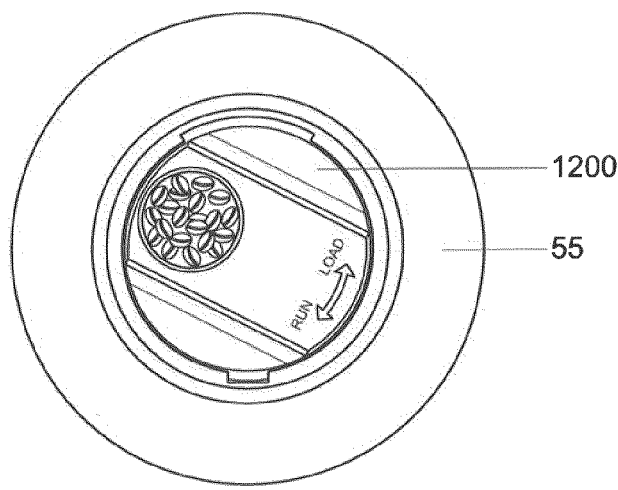
FIG. 12B shows the insert piece of FIG. 12A connected to the coffee brewing apparatus in an entry position.
Figure 12C:
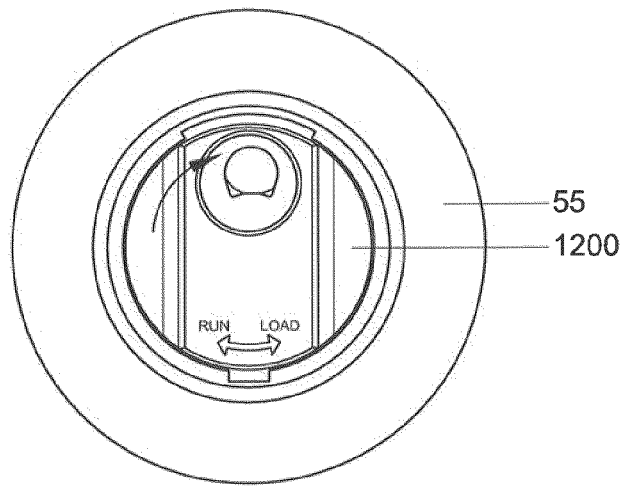
FIG. 12C shows the insert piece of FIG. 12A connected to the coffee brewing apparatus in a final position.

FIG. 12A shows a second type of insert piece 1200 that can be connected to the coffee brewing apparatus. It comprises a cavity 1210 with a size corresponding to a single dose of coffee beans. The insert piece comprises a closure member and closure disk arranged in the same way as in the coffee bean packaging cartridge, as described herein above with reference to FIGS. 7A-C, 8 and 9. When the insert piece is placed in the recess with the bayonet elements in the initial position as shown in FIG. 12B, the cavity 1220 is closed at its bottom. In this position the user fills the cavity with coffee beans, preferably with round compressed beans or coated compresses ground beans, because the flow easily. Then the insert piece 1200 is rotated by the user to its final position as shown in FIG. 12C, thereby opening the coffee bean outlet of the cavity and aligning it with the coffee bean entry of the coffee brewing apparatus. As a result, the single dose of coffee beans falls into the coffee brewing apparatus and can be ground.

It is thus believed that the operation and construction of the present invention will be apparent from the foregoing description. The invention is not limited to any embodiment herein described and, within the purview of the skilled person; modifications are possible which should be considered within the scope of the appended claims. For example the top wall 31 of the metering chamber may be located well above the highest part of the inlet opening 21 of the metering chamber. This means that if in the first step the transportation means is activated longer than required for filling the metering chamber, the metering chamber will always be filled up until about the highest part of the inlet opening.

Also, for example, the transportation means for transporting the coffee beans from the container to the metering chamber may be implemented as passive means not driven by a motor, for example by means of a downwardly extending bottom wall for transporting the coffee beans towards the exit opening and into the metering chamber under the influence of gravity only. A special means may in that case be required to close the inlet opening of the metering chamber once it is filled with coffee beans.

Similarly all kinematic inversions are considered inherently disclosed and to be within the scope of the present invention. The term "comprising" when used in this description or the appended claims should not be construed in an exclusive or exhaustive sense but rather in an inclusive sense. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Features which are not specifically or explicitly described or claimed may be additionally included in the structure according to the present invention without deviating from its scope.

The invention claimed is:

1. A coffee beverage system, including a coffee bean packaging cartridge and a coffee brewing apparatus wherein the coffee bean packaging cartridge is removable connected to the coffee brewing apparatus, the coffee bean packaging cartridge being arranged for holding and supplying multiple servings of coffee beans, the coffee beans packaging cartridge including:

a container comprising an interior volume and at least one exit opening defining a coffee bean outlet, the interior volume holding coffee beans;

transportation means adapted for enabling transportation of the coffee beans from the interior volume towards the exit opening of the cartridge;

wherein the coffee brewing apparatus comprises an entrance opening for receiving coffee beans which are transported with the aid of the transportation means towards the exit opening, a grinder for grinding coffee beans which have entered the coffee apparatus via the entrance opening and a brewing device for brewing coffee on the basis of ground coffee obtained by means of the grinder, wherein the system is further provided with a metering chamber for receiving coffee beans which are transported with the aid of the transportation means into the metering chamber, said metering chamber being arranged for receiving a portion of coffee beans corresponding to a dosed amount of coffee beans, the volume of the metering chamber being such that if it is completely filled with coffee beans the amount of beans corresponds with one dose of coffee beans for preparing a cup of coffee, wherein the metering chamber comprises a bottom portion which forms a part of the grinder, said bottom portion being arranged in the coffee brewing apparatus for rotating around a first axis extending in a vertical direction wherein the system is arranged such that upon activation of the grinder the bottom portion is rotating around the vertical axis for transporting the coffee beans from the metering chamber into the grinder and for grinding the coffee beans.

2. The system according to claim 1, wherein the bottom portion has a conical shape such that the bottom portion extends downwardly in a direction extending perpendicular to and away from the first vertical axis.

3. The system according to claim 1, wherein the metering chamber is divided in a first chamber portion which is part of the cartridge and a second chamber portion which is part of the coffee brewing apparatus wherein the second chamber portion comprises the bottom portion which forms a part of the grinder, said bottom portion being arranged in the coffee brewing apparatus for rotating around a first axis extending in a vertical direction.

4. The system according to claim 3, wherein the first chamber portion comprises the exit opening and the second chamber portion comprises the entrance opening wherein the first chamber portion is located above the second chamber portion wherein the exit opening extends above the entrance opening.

5. The system according to claim 1, wherein the dosed amount of coffee beans which is necessary for preparing a single cup coffee comprising 80-160 ml of coffee.

6. The system according to claim 1, wherein the transportation means comprise a part which is movable relative to the metering chamber for transporting the coffee beans towards and into the metering chamber upon driving of said transportation means.

7. The system according to claim 6, wherein the coffee brewing apparatus is provided with a first motor and a vertically extending drive shaft wherein said drive shaft is releasable connected with the transportation means of the cartridge for driving and thereby moving the transportation means upon rotation of the drive shaft by means of the motor means.

8. The system according to claim 6, wherein the movable part comprises a bottom and/or a plurality of vanes which rotate around a second vertical axis upon driving the transportation means.

9. The system according to claim 1, wherein the transportation means comprise a downwardly extending bottom wall such as a funnel of the container for transporting the coffee beans towards the metering chamber under the influence of gravity.

10. The system according to claims 9 wherein the transportation means comprise a part which is movable relative to the metering chamber for transporting the coffee beans towards and into the metering chamber upon driving of said transportation means, wherein the transportation means comprise the funnel of the container and the part which is movable relative to the metering chamber.

11. The system according to claim 1, wherein the transportation means comprise a downwardly extending bottom wall for transporting the coffee beans towards the metering chamber under the influence of gravity only.

12. The system according to claim 3, wherein the first chamber portion is provided with a top wall which limits the volume of the metering chamber in an upwardly vertical direction wherein the bottom portion of the second chamber portion limits the volume of the metering chamber in a downwardly vertical direction.

13. The system according to claim 3, wherein the first chamber portion and the second chamber portion are each provided with at least one upstanding side wall limiting the volume of the metering chamber.

14. The system according to claim 3, wherein the first chamber portion is provided with an upstanding side wall comprising an inlet opening for entering the coffee beans by means of the transportation means into the metering chamber.

15. The system according to claim 1, wherein the transportation means are arranged for transporting the coffee beans at least in a horizontal direction for transporting the coffee beans into the metering chamber.

16. The system according to claims 14, wherein the transportation means are arranged for transporting the coffee beans at least in a horizontal direction for transporting the coffee beans into the metering chamber, wherein the transportation means are arranged for transporting the coffee beans at least in a horizontal direction towards the inlet opening of the metering chamber.

17. The system according to claim 16, wherein the transportation means comprise a part which is movable relative to the metering chamber for transporting the coffee beans towards and into the metering chamber upon driving of said transportation means, wherein the movable part of the transportation means are arranged for transporting the coffee beans at least in a horizontal direction.

18. The system according to claim 1, wherein the coffee bean packaging cartridge comprises closing means for closing the coffee bean outlet when the coffee bean packaging cartridge is not connected to the coffee brewing apparatus.

19. The system according to claim 18, wherein the closing means are configured for opening the coffee bean outlet when the coffee bean packaging cartridge is connected to the coffee brewing apparatus.

20. The system according to claim 18, wherein the closing means comprises a closure member at the bottom side of the container comprising the coffee bean outlet and a rotatable closing disk having an opening.

21. The system according to claim 20, wherein in order to connect the coffee bean packaging cartridge to the coffee brewing apparatus the opening of the rotatable closing disk is brought in a position aligned with the coffee bean outlet.

22. The system according to claim 21, wherein the closure member comprises a pair of flexible latching arms and the closure disk comprises a detent, which in the closed position is caught behind the flexible latching arms.

23. The system according to claim 1, wherein the exit opening is associated with a removable sealing element sealing the interior volume prior to activation of the cartridge wherein said sealing element prevents gasses to escape from the cartridge.

24. The system according to claim 23, further including means for disrupting and displacing the sealing element.

25. The system according to claim 23, wherein the sealing element is a sealing membrane.

26. The system according to claim 24, wherein the means for disrupting and displacing is a pull tab.

27. The system according to claim 3, wherein the grinder is positioned centrically with respect to the metering chamber and/or in that the grinder is positioned centrically with respect to the second chamber portion.

28. The system according to claim 2, wherein the bottom portion with the conical shape lies in the direction of the first vertical axis, wherein the conical part rotates around the first vertical axis upon driving the grinder.

29. The system according to claim 28, wherein the grinder comprises the bottom portion, a lower grinding disk extending around the bottom portion and an upper grinding disk extending above the lower grinding disk.

30. The system according to claim 29, wherein the grinder is rotationally driven by a second motor, resulting in the rotation of the bottom portion with the conical shape and the lower grinding disk.

31. The system according to claim 30, wherein upon driving the bottom portion and lower grinding disk coffee beans are moved in an outwardly extending radial direction between the lower grinding disk and the upper grinding disk and in that the coffee beans are crunched and cut into ground coffee, because a vertical distance between the lower grinding disk and the upper grinding disk decreases in the outwardly extending radial direction.

32. The system according to claim 1, wherein the grinder is a no contamination grinder, comprising an exit location for ground coffee out into a ground coffee chute, which is a funnel pointing downwards into the brewing device of the coffee brewing apparatus.

33. The system according to claim 1, wherein the coffee brewing apparatus comprises connection means for the removable connection to the coffee bean packaging cartridge, the connection means comprising a recess at an upper side of the coffee brewing apparatus, the recess being surrounded by a side wall and being configured for receiving a corresponding part protruding from a lower side of the coffee bean packaging cartridge.

34. The system according to claim 33, wherein the side wall protrudes from the upper side of the coffee brewing apparatus.

35. The system according to claim 34, wherein the side wall comprises openings for receiving bayonet elements of the coffee bean packaging cartridge.

36. The system according to claim 35, wherein the coffee bean packaging cartridge comprises the bayonet elements.

37. The system according to claim 35, wherein the coffee bean packaging cartridge should be inserted into the recess such that the bayonet elements are inserted in the openings and then rotated in order to be connected to the coffee brewing apparatus, wherein the side wall comprises blocking elements for impeding a further rotation of the coffee bean packaging cartridge, when it has reached its final position.

38. The system according to claim 37, wherein the coffee bean packaging cartridge should be rotated approximately 50 degrees in order to reach its final position.

39. The system according to claim 7, wherein the coffee brewing apparatus comprises connection means for the removable connection to the coffee bean packaging cartridge, the connection means comprising a recess at an upper side of the coffee brewing apparatus, the recess being surrounded by a side wall and being configured for receiving a corresponding part protruding from a lower side of the coffee bean packaging cartridge, and wherein the recess comprises rotatable protruding edges at its center, which are fixed at the driving shaft wherein the transportation means of the cartridge is provided with recesses for receiving the protruding edges such that upon rotation of the drive shaft the rotating protruding edges drive the transportation means.

40. The system according to claim 34, wherein the coffee brewing apparatus comprises a housing surrounding the protruding side wall.

41. The system according to claim 2, wherein the first vertical axis runs centrally through the bottom portion of the metering chamber and in that the bottom portion extends downwardly in a direction extending perpendicular to and away from the vertical axis all around the vertical axis and/or in that the first vertical axis runs centrally through the bottom portion of the second chamber portion and in that the bottom portion extends downwardly in a direction extending perpendicular to and away from the vertical axis all around the vertical axis.

42. The system according to claim 1, wherein the coffee brewing apparatus is provided with a control device.

43. The system according to claim 7, wherein the coffee brewing apparatus is provided with a control device, and wherein the control device is arranged for controlling the first motor and/or the grinder.

44. The system according to claim 43, wherein the control device is arranged such that, in use, in a first step the transportation means is driven for filling the metering chamber with coffee beans and that in a second step which follows after the completion of the first step the grinding device is activated for emptying the metering chamber and for grinding coffee beans which were collected in the metering chamber during the first step.

45. The system according to claim 44, wherein the control device is arranged such that, in use, in the first step the transportation means is driven longer than is required for filling the metering chamber with coffee beans and/or that in the second step the grinding device is activated longer than is required for emptying or at least substantially completely emptying the metering chamber and for grinding all the coffee beans which were collected in the metering chamber during the first step.

46. The system according to claim 45, wherein in the first step the transportation means is driven longer than is required for completely filling or at least substantially completely filling the metering chamber with coffee beans.

47. The system according to claim 45, wherein the volume of the metering chamber is such that if it is filled with coffee beans in the first step the amount of beans corresponds with one dose of coffee beans for preparing a cup of coffee.

48. The system according to claim 44, wherein the coffee brewing apparatus is arranged such that the control device controls the brewing device wherein the control device is arranged such that, in use, in a third step which follows after that the second step is completed the brewing device is brewing coffee based on the ground coffee and heated water heated by a heating device of the coffee brewing apparatus.

49. The system according to claim 1, further comprising a sensor arranged for detecting if the coffee bean packaging cartridge is connected to the coffee brewing apparatus.

50. The system according to claim 49, wherein the coffee brewing apparatus is provided with a control device, and wherein the sensor is configured to signal a result of the detection to the control device.

51. The system according to claim 49, wherein the sensor is a switch.

52. The system according to claim 49, wherein the switch is a micro switch.

53. The system according to claim 51, wherein the coffee bean packaging cartridge comprises a protruding part for activating the switch when it is connected to the coffee brewing apparatus.

54. The system according to claim 36, further comprising a sensor arranged for detecting if the coffee bean packaging cartridge is connected to the coffee brewing apparatus, wherein the sensor is a switch, wherein the coffee bean packaging cartridge comprises a protruding part for activating the switch when it is connected to the coffee brewing apparatus, and wherein the protruding part is located below or above one of the bayonet elements.

55. The system according to claim 37, further comprising a sensor arranged for detecting if the coffee bean packaging cartridge is connected to the coffee brewing apparatus, wherein the sensor is a switch, wherein the coffee bean packaging cartridge comprises a protruding part for activating the switch when it is connected to the coffee brewing apparatus, and wherein the protruding part activates the switch when the coffee bean packaging cartridge reaches its final position.

56. The system according to claim 35, further comprising a sensor arranged for detecting if the coffee bean packaging cartridge is connected to the coffee brewing apparatus, wherein the sensor is a switch, wherein the coffee bean packaging cartridge comprises a protruding part for activating the switch when it is connected to the coffee brewing apparatus, and wherein the switch is located in an opening in the sidewall surrounding the recess at the upper side of the coffee brewing apparatus, the protruding part activating the switch through the opening.

57. The system according to claim 56, wherein the switch is hidden behind horizontal wall segments in the side wall and in that the opening is a slit between the horizontal wall segments, the protruding part fitting in the slit.

58. The system according to claim 43, further comprising a sensor arranged for detecting if the coffee bean packaging cartridge is connected to the coffee brewing apparatus, and wherein the controller is arranged for controlling the first motor and the grinder so that they can be activated only if it has been detected that the coffee bean packaging cartridge is connected to the coffee brewing apparatus.

59. The system according to claim 1, further comprising an insert piece that is removable connectable to the coffee brewing apparatus in lieu of the coffee bean packaging cartridge.

60. The system according claim 59, wherein the insert piece is connectable to the coffee brewing apparatus in a same or similar way as the coffee bean packaging cartridge.

61. The system according to claims 35, further comprising an insert piece that is removable connectable to the coffee brewing apparatus in lieu of the coffee bean packaging cartridge, wherein the insert piece is connectable to the coffee brewing apparatus in a same or similar way as the coffee bean packaging cartridge, and wherein the insert piece comprises bayonet elements.

62. The system according to claim 51, further comprising an insert piece that is removable connectable to the coffee brewing apparatus in lieu of the coffee bean packaging cartridge, wherein the insert piece comprises a protruding part for activating the switch when it is connected to the coffee brewing apparatus.

63. The system according to claim 61, further comprising a sensor arranged for detecting if the coffee bean packaging cartridge is connected to the coffee brewing apparatus, wherein the sensor is a switch, further comprising an insert piece that is removable connectable to the coffee brewing apparatus in lieu of the coffee bean packaging cartridge, wherein the insert piece comprises a protruding part for activating the switch when it is connected to the coffee brewing apparatus, wherein the protruding part is located below or above one of the bayonet elements.

64. The system according to claim 37, further comprising a sensor arranged for detecting if the coffee bean packaging cartridge is connected to the coffee brewing apparatus, wherein the sensor is a switch, further comprising an insert piece that is removable connectable to the coffee brewing apparatus in lieu of the coffee bean packaging cartridge, wherein the insert piece comprises a protruding part for activating the switch when it is connected to the coffee brewing apparatus, wherein the protruding part activates the switch when the insert piece reaches its final position.

65. The system according to claim 59, wherein the insert piece comprises a cavity having an interior volume and at least one exit opening defining a coffee bean outlet, the interior volume being arranged for receiving coffee beans, the insert piece further comprising closing means for closing the coffee bean outlet when the insert piece is not connected to the coffee brewing apparatus or not connected to the coffee brewing apparatus in its final position.

66. The system according to claim 65, wherein the closing means are configured for opening the coffee bean outlet when the insert piece is connected to the coffee brewing apparatus in its final position.

67. The system according to claim 65, wherein the closing means comprises a closure member at the bottom side of the cavity comprising the coffee bean outlet and in that the closing means furthermore comprises a rotatable closing disk having an opening.

68. The system according to claim 67, wherein when the insert piece is connected to the coffee brewing apparatus in its final position, the opening of the rotatable closing disk is in a position aligned with the coffee bean outlet.

69. The system according to claim 1, wherein the system is arranged such that upon activation of the grinder the bottom portion is rotating around the first vertical axis for transporting the dose of coffee beans from the metering chamber into the grinder and for grinding the coffee beans.

70. The system according to claim 69, wherein the one dose of coffee beans comprises 5-11 grams of coffee beans.

71. The system according to claim 3, wherein the second chamber portion comprises about 100-X % of the volume of the metering chamber and the first chamber portion comprises about X % of the volume of the metering chamber wherein X is in the range of 2-50.

72. The system according to claim 1, wherein the system is arranged such that, in use, the grinding device is activated for emptying the metering chamber and for grinding the coffee beans collected in the metering chamber.

73. The system according to claim 72, wherein the system is arranged such that in use the grinding device is activated longer than is required for emptying or substantially emptying the metering chamber and for grinding all the coffee beans collected in the metering chamber.

74. The system according to claim 72, wherein previous to the emptying of the metering chamber and the grinding of the coffee beans, in a first step the transportation means is driven for filling the metering chamber with coffee beans.

75. The system according to claim 74, wherein the transportation means is driven longer than is required for completely filling or at least substantially completely filling the metering chamber with coffee beans.

76. The system according to claim 1, wherein the coffee bean packaging cartridge is filled with coffee beans.

77. The system according to claim 76, wherein the container is filled with one dose of coffee beans.

78. The system according to claim 76, wherein the coffee bean packaging is filled with multiple servings of coffee beans.

79. The system according claim 1, wherein the coffee brewing apparatus comprises closing means which are configured for opening and/or closing the entrance opening of the coffee brewing apparatus, said closing means being configured to be controlled by the coffee brewing apparatus and/or the (dis)connection of the packaging cartridge (from) to the coffee brewing apparatus.

80. The system according to claim 1, wherein at least a lower portion of the metering chamber is part of a dosing device.

81. A coffee brewing apparatus for use in a coffee beverage system according to claim 1, comprising an entrance opening for receiving coffee beans, a grinder for grinding coffee beans which have entered the coffee apparatus via the entrance opening and a brewing device for brewing coffee on the basis of ground coffee obtained by means of the grinder, wherein the coffee brewing apparatus is further provided with at least a lower portion of a metering chamber for receiving coffee beans via the entrance opening, said metering chamber being arranged for receiving a portion of coffee beans corresponding to a dosed amount of coffee beans, the volume of the metering chamber being such that if it is completely filled with coffee beans the amount of beans corresponds with one dose of coffee beans for preparing a cup of coffee, wherein the metering chamber comprises a bottom portion which forms a part of the grinder, said bottom portion being arranged in the coffee brewing apparatus for rotating around a first axis extending in a vertical direction wherein the coffee brewing apparatus is arranged such that upon activation of the grinder the bottom portion is rotating around the vertical axis for transporting the coffee beans from the metering chamber into the grinder and for grinding the coffee beans.

82. The apparatus according to claim 81, wherein the bottom portion has a conical shape such that the bottom portion extends downwardly in a direction extending perpendicular to and away from the first vertical axis.

83. The apparatus according to claim 81, wherein the metering chamber comprises the entrance opening and/or wherein the apparatus comprises only the lower portion of the metering chamber and wherein the cartridge comprises an upper portion of the metering chamber said lower portion and said upper portion forming the metering chamber and wherein the first chamber portion comprises an inlet opening for coffee beans.

84. The apparatus according to claim 81, wherein the dosed amount of coffee beans is necessary for preparing a single cup coffee comprising 80-160 ml of coffee.

85. The apparatus according to claim 81, wherein the coffee brewing apparatus is provided with a first motor and a vertically extending drive shaft.

86. The apparatus according to claim 81, wherein the bottom portion of the metering chamber limits the volume of the metering chamber in a downwardly vertical direction.

87. The apparatus according to claim 81, wherein the metering chamber is provided with at least one upstanding side wall limiting the volume of the metering chamber.

88. The apparatus according to claim 81, wherein the coffee brewing apparatus comprises closing means which are configured for opening and/or closing the entrance opening of the coffee brewing apparatus.

89. The apparatus according to claim 88, wherein the closing means comprises a rotatable closing disk having an opening.

90. The apparatus according to claim 81, wherein the grinder is positioned centrically with respect to the metering chamber.

91. The apparatus according to claim 82, wherein the bottom portion with the conical shape lies in the direction of the first vertical axis, wherein the conical part rotates around the first vertical axis upon driving the grinder.

92. The apparatus according to claim 91, wherein the grinder comprises the bottom portion, a lower grinding disk extending around the bottom portion and an upper grinding disk extending above the lower grinding disk.

93. The apparatus according to claim 92, wherein the grinder is rotationally driven by a second motor, resulting in the rotation of the bottom portion with the conical shape and the lower grinding disk.

94. The apparatus according to claim 93, wherein upon driving the bottom portion and lower grinding disk coffee beans are moved in an outwardly extending radial direction between the lower grinding disk and the upper grinding disk and in that the coffee beans are crunched and cut into ground coffee, because a vertical distance between the lower grinding disk and the upper grinding disk decreases in the outwardly extending radial direction.

95. The apparatus according to claim 81, wherein the grinder is a no contamination grinder, comprising an exit location for ground coffee out into a ground coffee chute, which is a funnel pointing downwards into the brewing device of the coffee brewing apparatus.

96. The apparatus according to claim 81, wherein the coffee brewing apparatus comprises connection means, the connection means comprising a recess at an upper side of the coffee brewing apparatus, the recess being surrounded by a side wall.

97. The apparatus according to claim 96, wherein the side wall protrudes from the upper side of the coffee brewing apparatus.

98. The apparatus according to claim 96, wherein the side wall comprises openings for receiving bayonet elements.

99. The apparatus according to claim 96, wherein the recess comprises rotatable protruding edges at its center, which are fixed at the driving shaft.

100. The apparatus according to claim 96, wherein the coffee brewing apparatus comprises a housing surrounding the protruding side wall.

101. The apparatus according to claim 81, wherein the first vertical axis runs centrally through the bottom portion of the metering chamber and in that the bottom portion extends downwardly in a direction extending perpendicular to and away from the vertical axis all around the vertical axis.

102. The apparatus according to claim 81, wherein the coffee brewing apparatus is provided with a control device.

103. The apparatus according to claim 102, wherein the coffee brewing apparatus is provided with a first motor and a vertically extending drive shaft, and wherein the control device is arranged for controlling the first motor and/or the grinder.

104. The apparatus according to claim 103, wherein the control device is arranged such that, in use, in a first step the metering chamber is filled with coffee beans and that in a second step which follows after the completion of the first step the grinding device is activated for emptying the metering chamber and for grinding coffee beans which were collected in the metering chamber during the first step.

105. The apparatus according to claim 104, wherein the control device is arranged such that, in use, in the second step the grinding device is activated longer than is required for emptying or at least substantially completely emptying the metering chamber and for grinding all the coffee beans which were collected in the metering chamber during the first step.

106. The apparatus according to claim 104, wherein the volume of the metering chamber is such that if it is filled with coffee beans in the first step the amount of beans corresponds with one dose of coffee beans for preparing a cup of coffee.

107. The apparatus according to claim 103, wherein the coffee brewing apparatus is arranged such that the control device controls the brewing device, wherein the control device is arranged such that, in use, in a third step which follows after that the second step is completed the brewing device is brewing coffee based on the ground coffee and heated water heated by a heating device of the coffee brewing apparatus.

108. The apparatus according to claim 81, further comprising a sensor arranged for detecting if a coffee bean packaging cartridge is connected to the coffee brewing apparatus.

109. The apparatus according to claim 108, wherein the coffee brewing apparatus is provided with a control device, and wherein the sensor is configured to signal a result of the detection to the control device.

110. The apparatus according to claim 108, wherein the sensor is a switch.

111. The apparatus according to claim 109, wherein the switch is a micro switch.

112. The apparatus according to claim 109, wherein the coffee brewing apparatus comprises connection means, the connection means comprising a recess at an upper side of the coffee brewing apparatus, the recess being surrounded by a side wall, and wherein the switch is located in an opening in the sidewall surrounding the recess at the upper side of the coffee brewing apparatus.

113. The apparatus according to claim 112, wherein the switch is hidden behind horizontal wall segments in the side wall and in that the opening is a slit between the horizontal wall segments.

114. The apparatus according to claim 85, wherein the coffee brewing apparatus is provided with a control device, wherein the control device is arranged for controlling the first motor and the grinder so that they can be activated only if it has been detected that a coffee bean packaging cartridge is connected to the coffee brewing apparatus.

115. The apparatus according to claim 81, wherein the apparatus is arranged such that upon activation of the grinder the bottom portion is rotating around the first vertical axis for transporting the dose of coffee beans from the metering chamber into the grinder and for grinding the coffee beans.

116. The apparatus according to claim 81, wherein the apparatus is arranged such that, in use, the grinding device is activated for emptying the metering chamber and for grinding the coffee beans collected in the metering chamber.

117. The apparatus according to claim 115, wherein the apparatus is arranged such that in use the grinding device is activated longer than is required for emptying or at least substantially completely emptying the metering chamber and for grinding all the coffee beans collected in the metering chamber.

118. The apparatus according to claim 116, wherein previous to the emptying of the metering chamber and the grinding of the coffee beans, in a first step the metering chamber is filled with coffee beans.

119. The apparatus according to claim 81, further comprising further comprising an insert piece that is removable connectable to the coffee brewing apparatus in lieu of the coffee bean packaging cartridge.

120. The coffee beverage system according to claim 1, further comprising an insert piece that is removable connectable to the coffee brewing apparatus in lieu of the coffee bean packaging cartridge.

121. A coffee bean packaging cartridge suitable for use in a coffee beverage system according to claim 80.

122. A coffee beverage system, including a coffee bean packaging cartridge and a coffee brewing apparatus wherein the coffee bean packaging cartridge is removable connected to the coffee brewing apparatus, the coffee bean packaging cartridge being arranged for holding and supplying multiple servings of coffee beans, the coffee beans packaging cartridge including:
- a container comprising an interior volume and at least one exit opening defining a coffee bean outlet, the interior volume holding coffee beans;
- transportation means adapted for enabling transportation of the coffee beans from the interior volume towards the exit opening of the cartridge;
- wherein the coffee brewing apparatus comprises an entrance opening for receiving coffee beans which are transported with the aid of the transportation means towards the exit opening, a grinder for grinding coffee beans which have entered the coffee apparatus via the entrance opening and a brewing device for brewing coffee on the basis of ground coffee obtained by means of the grinder, wherein the system is further provided with a metering chamber for receiving coffee beans which are transported with the aid of the transportation means into the metering chamber, said metering chamber being arranged for receiving a portion of coffee beans corresponding to a dosed amount of coffee beans, the volume of the metering chamber being such that if it is completely filled with coffee beans the amount of beans corresponds with one dose of coffee beans for preparing a coup of coffee, wherein the metering chamber is divided in a first chamber portion which is part of the cartridge and a second chamber portion which is part of the coffee brewing apparatus wherein the second chamber portion comprises a bottom portion which forms a part of the grinder, said bottom portion being arranged in the coffee brewing apparatus for rotating around a first axis extending in a vertical direction wherein the system is arranged such that upon activation of the grinder the bottom portion is rotating around the vertical axis for transporting the coffee beans from the metering chamber into the grinder and for grinding the coffee beans.

123. A system according to claim 122, wherein the bottom portion has a conical shape such that the bottom portion extends downwardly in a direction extending perpendicular to and away from the first vertical axis.

* * * * *